US012665126B2

(12) United States Patent
Umegami et al.

(10) Patent No.: US 12,665,126 B2
(45) Date of Patent: Jun. 23, 2026

(54) COIL COMPONENT, AND SUBSTRATE WITH INTEGRATED COIL

(71) Applicant: ROHM CO., LTD., Kyoto (JP)

(72) Inventors: Hirokatsu Umegami, Kyoto (JP); Atsushi Yamaguchi, Kyoto (JP); Manabu Ishitobi, Yamatokoriyama (JP)

(73) Assignee: ROHM CO., LTD., Kyoto (JP)

( * ) Notice: Subject to any disclaimer, the term of this patent is extended or adjusted under 35 U.S.C. 154(b) by 759 days.

(21) Appl. No.: 18/006,113

(22) PCT Filed: Jul. 21, 2021

(86) PCT No.: PCT/JP2021/027293
§ 371 (c)(1),
(2) Date: Jan. 19, 2023

(87) PCT Pub. No.: WO2022/024914
PCT Pub. Date: Feb. 3, 2022

(65) Prior Publication Data

US 2024/0013973 A1 Jan. 11, 2024

(30) Foreign Application Priority Data

Jul. 30, 2020 (JP) ................................ 2020-128884

(51) Int. Cl.
*H01F 27/28* (2006.01)
*H01F 27/34* (2006.01)

(52) U.S. Cl.
CPC ........... *H01F 27/346* (2013.01); *H01F 27/28* (2013.01)

(58) Field of Classification Search
CPC .................. H01F 27/346; H01F 27/28; H01F 2027/2809; H01F 27/2804; H01F 17/06;
(Continued)

(56) References Cited

U.S. PATENT DOCUMENTS 6,031,445 A * 2/2000 Marty ...................... H10D 1/20
336/200
10,410,782 B2 9/2019 Otsubo et al.
(Continued)

FOREIGN PATENT DOCUMENTS

CN 1871671 A 11/2006
JP 2011-124250 A 6/2011
(Continued)

OTHER PUBLICATIONS

Office Action issued in corresponding Chinese Patent application No. 202180058769.7, Dec. 25, 2025, and machine translation (14 pages).

(Continued)

*Primary Examiner* — Shawki S Ismail
*Assistant Examiner* — Kazi S Hossain
(74) *Attorney, Agent, or Firm* — HSML P.C.

(57) ABSTRACT

A coil component includes a primary winding generating a magnetic field by current input from outside, and a secondary winding an induced current generated by the magnetic field passes. The primary winding includes ring-shaped primary first/second turns as viewed in first direction. The secondary winding includes ring-shaped secondary first/second turns as viewed in first direction. The primary and secondary first turns are alternately arranged in first direction to form a first tubular portion. The primary and secondary second turns are alternately arranged in first direction to form a second tubular portion. The second tubular portion is located inside the first tubular portion as viewed in first direction. The input current in each primary first turn and the input current in each primary second turn flow in the same direction.

22 Claims, 20 Drawing Sheets

(58) Field of Classification Search
CPC .... H01F 17/062; H01F 27/2895; H01F 30/16; H01F 2038/305
USPC .......................... 336/220, 221, 183, 176, 229
See application file for complete search history.

(56) References Cited

U.S. PATENT DOCUMENTS

| | | | | |
|---|---|---|---|---|
| 2002/0105406 | A1* | 8/2002 | Liu | H01F 27/2804 336/200 |
| 2005/0229385 | A1 | 10/2005 | Pleskach et al. | |
| 2015/0200049 | A1* | 7/2015 | Kim | H01F 27/2804 336/200 |
| 2017/0018349 | A1* | 1/2017 | Otsubo | H01F 17/0033 |
| 2018/0122559 | A1* | 5/2018 | Francis | H01F 27/24 |
| 2021/0335531 | A1* | 10/2021 | Ryu | H01F 38/30 |

FOREIGN PATENT DOCUMENTS

| | | | |
|---|---|---|---|
| WO | 2017/188077 | A1 | 11/2017 |
| WO | 2020/087973 | A1 | 5/2020 |

OTHER PUBLICATIONS

International Search Report issued in PCT/JP2021/027293, Oct. 19, 2021 (2 pages).
Office Action issued in corresponding Japanese Patent application No. 2022-540239, Jan. 7, 2025, and machine translation (6 pages).
Office Action issued in corresponding German Patent application No. 11 2021 003 048.5, Mar. 25, 2025, and machine translation (18 pages).

* cited by examiner

COIL COMPONENT, AND SUBSTRATE WITH INTEGRATED COIL

TECHNICAL FIELD

The present disclosure relates to a coil component, and a substrate with an integrated coil.

BACKGROUND ART

Coil components such as inductors and transformers are used in a variety of electric equipment. Patent Document 1 discloses an example of a coil component (an inductor and a transformer) that uses a spiral coil.

TECHNICAL REFERENCE

Patent Document

Patent Document 1: JP-A-2011-124250

SUMMARY OF THE INVENTION

Problems to be Solved by the Invention

It is generally desirable that inductors and transformers have as little magnetic flux leakage as possible. This is because magnetic flux leakage can cause generation of radiation noise and heat generation.

The present disclosure has been proposed under the above-noted circumstances, and an object of the present disclosure is to provide a coil component designed to reduce magnetic flux leakage and a coil built-in substrate incorporating such a coil component.

Means for Solving the Problems

A coil component provided according to a first aspect of the present disclosure includes a primary winding that generates a magnetic field by an input current from outside, and a secondary winding through which an induced current generated by the magnetic field flows. The primary winding includes a plurality of primary first turns and a plurality of primary second turns each of which is ring-shaped as viewed in a first direction. The secondary winding includes a plurality of secondary first turns and a plurality of secondary second turns each of which is ring-shaped as viewed in the first direction. The plurality of primary first turns and the plurality of secondary first turns are alternately arranged in the first direction to form a first tubular portion. The plurality of primary second turns and the plurality of secondary second turns are alternately arranged in the first direction to form a second tubular portion. The second tubular portion is located inside the first tubular portion as viewed in the first direction. The direction in which the input current flows in each of the plurality of primary first turns and the direction in which the input current flows in each of the plurality of primary second turns are the same.

A coil component provided according to a second aspect of the present disclosure includes a winding that generates a magnetic field by an input current from outside. The winding includes a plurality of first turns and a plurality of second turns each of which is ring-shaped as viewed in a first direction. The plurality of first turns are arranged in the first direction to form a first tubular portion. The plurality of second turns are arranged in the first direction to form a second tubular portion. The second tubular portion is located inside the first tubular portion as viewed in the first direction. Each of the first tubular portion and the second tubular portion is annular as viewed in a thickness direction orthogonal to the first direction. The direction in which the input current flows in each of the plurality of primary first turns and the direction in which the input current flows in each of the plurality of primary second turns are the same.

A coil built-in substrate provided according to a third aspect of the present disclosure incorporates the coil component provided according to the first aspect or the coil component provided according to the second aspect. The coil built-in substrate includes a plurality of interconnect layers laminated in the thickness direction, and a plurality of insulating layers interposed between the plurality of interconnect layers in the thickness direction. The coil component is constituted by wiring patterns of the plurality of interconnect layers.

Advantages of the Invention

The coil component and the coil built-in substrate according to the present disclosure can reduce magnetic flux leakage.

MODE FOR CARRYING OUT THE INVENTION

Preferred embodiments of a coil component and a coil built-in substrate are described below with reference to the accompanying drawings. In the description given below, the same or similar elements are denoted by the same reference signs, and descriptions thereof are omitted.

A coil component A1 according to a first embodiment is described below with reference to FIGS. 1 to 14. The coil component A1 is a transformer, for example, and includes a primary winding 1 and a secondary winding 2. The coil component A1 may include a magnetic core, but preferably has an air-core structure without a magnetic core. The coil component A1 may be toroidal in appearance. Preferably, the planar shape of the coil component A1 is the shape of a substantially closed ring such as a circular ring (i.e., annular), an elliptical ring or a polygonal ring. The planar shape of the coil component A1 need not necessarily be closed. Preferably, the cross-sectional shape of the coil component A1 is the shape of a substantially closed ring such as a circular ring (i.e., annular), an elliptical ring or a polygonal ring. The overall shape of the coil component A1 is defined by various combinations of the above-noted planar shapes and cross-sectional shapes. The first embodiment describes the example in which the planar shape is annular and the cross-sectional shape is the shape of a rectangular ring. For convenience of description, in a plan view of the coil component A1, the direction in which the central axis extends is referred to as the axial direction s, the direction around the central axis as the circumferential direction t, and the direction extending radially from the central axis as the radial direction u. The axial direction s corresponds to the thickness direction of the coil component A1. The circumferential direction t corresponds to the toroidal direction of the coil component A1. The above-noted sectional shape refers to the shape in cross section in the plane defined by the axial direction s and the radial direction u. The circumferential direction t corresponds to the "first direction", and the axial direction s corresponds to the "thickness direction".

Figure 1:
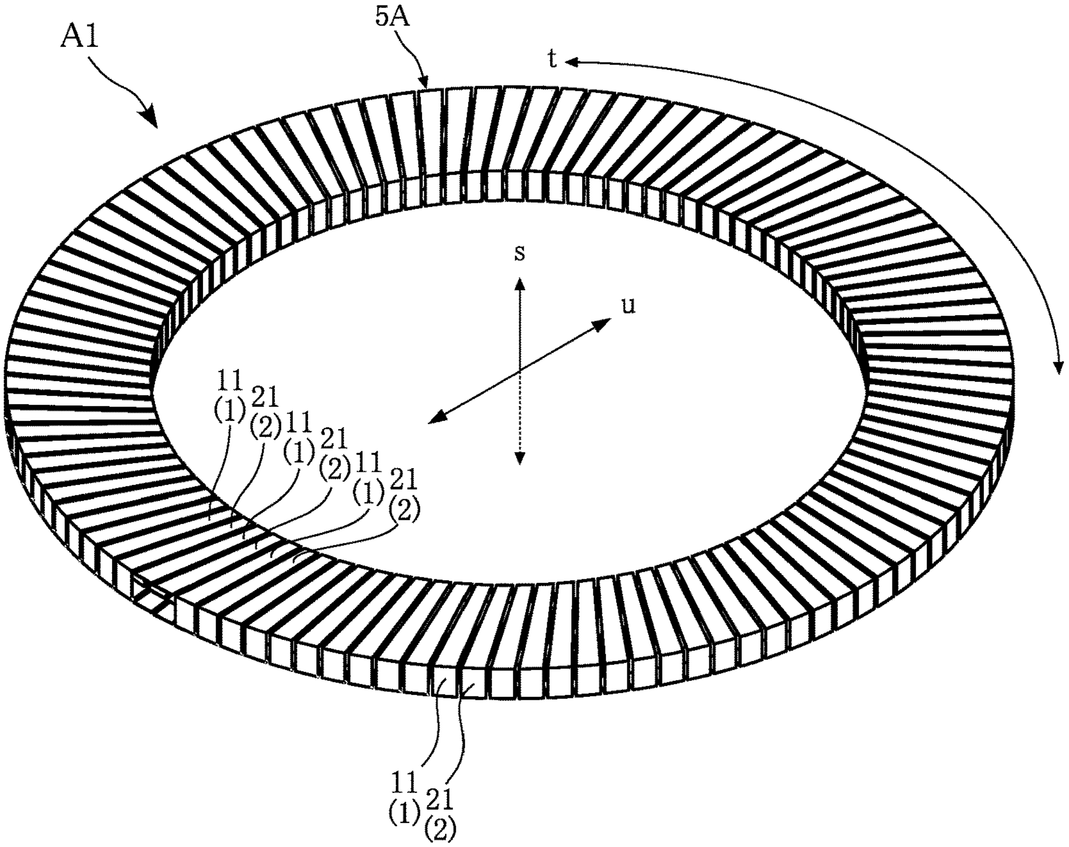
FIG. 1 is a perspective view showing a coil component according to a first embodiment.
Figure 2:
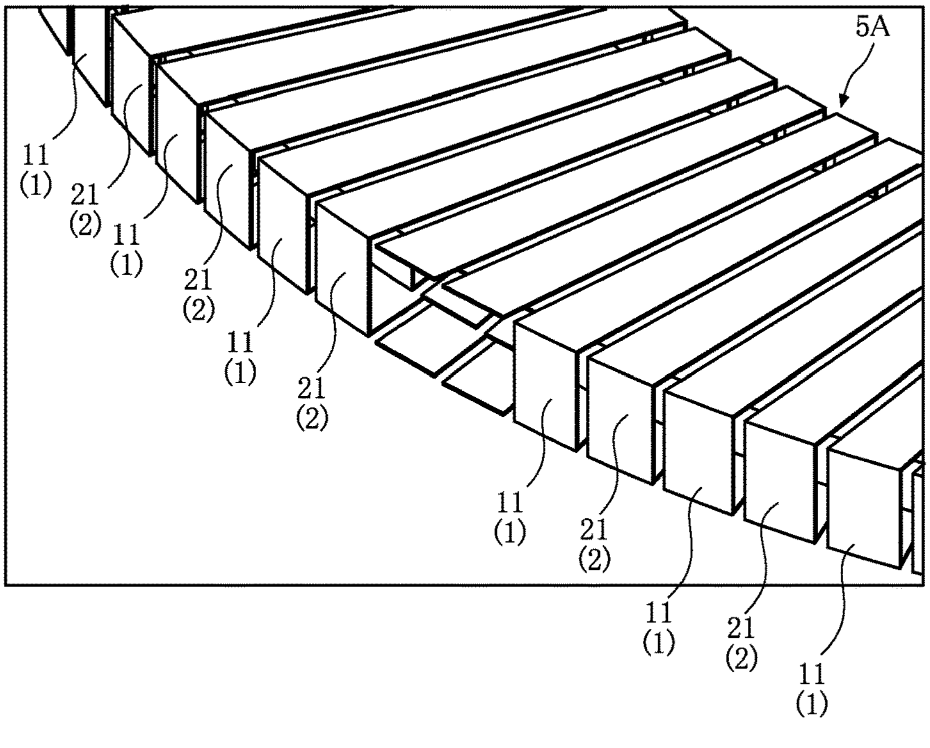
FIG. 2 is an enlarged view showing a part of FIG. 1.
Figure 3:
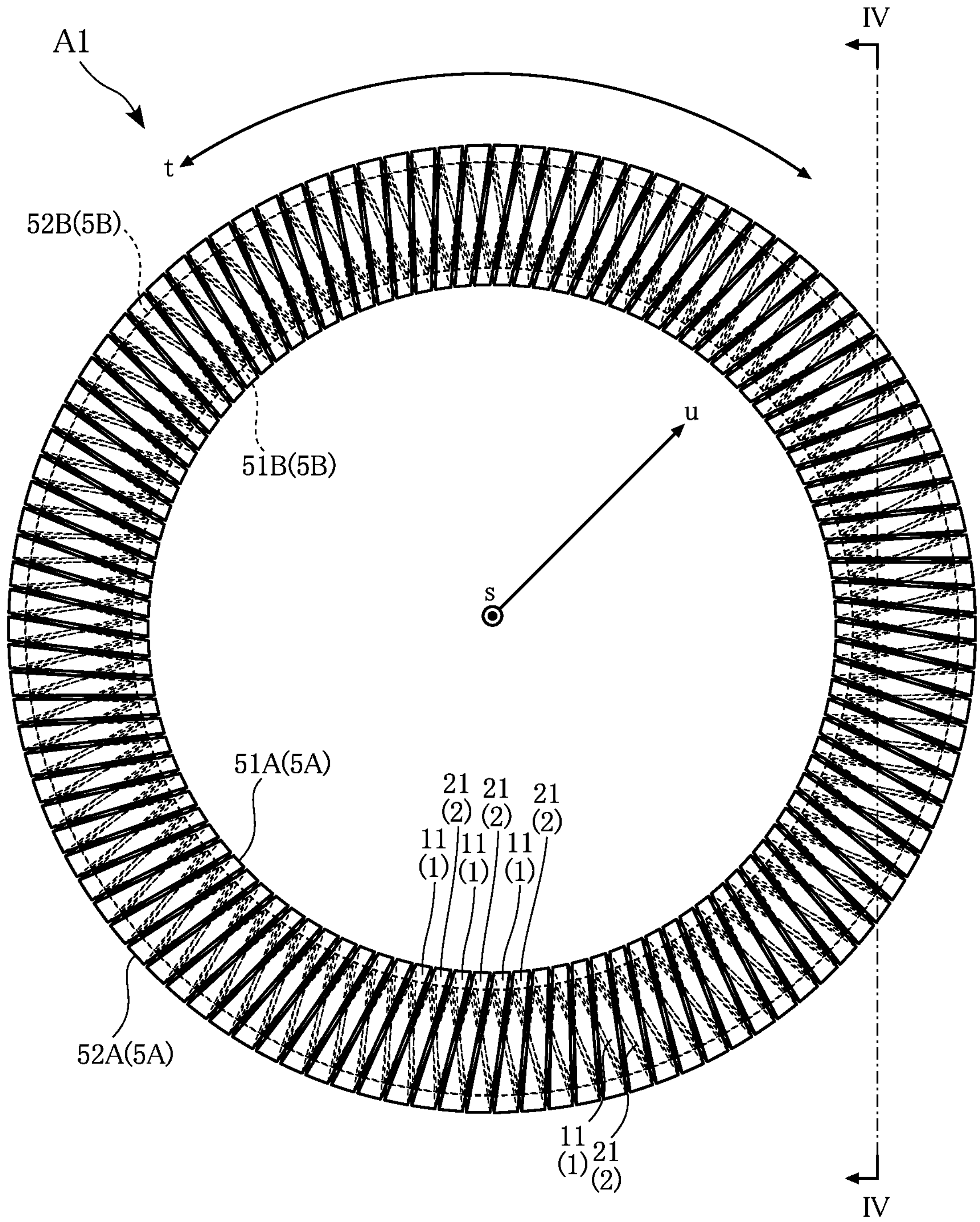
FIG. 3 is a plan view showing the coil component according to the first embodiment.
Figure 4:
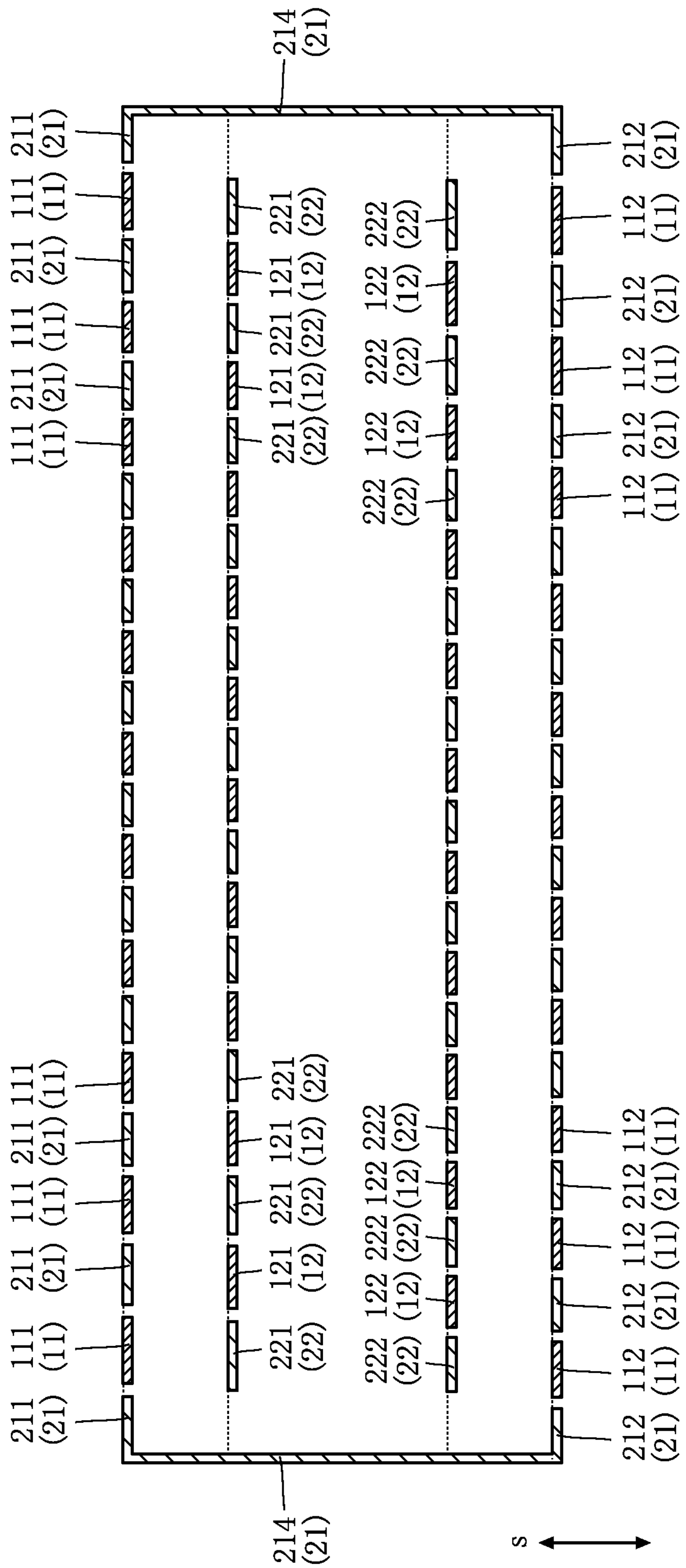
FIG. 4 is a cut end view along line IV-IV in FIG. 3.
Figure 5:
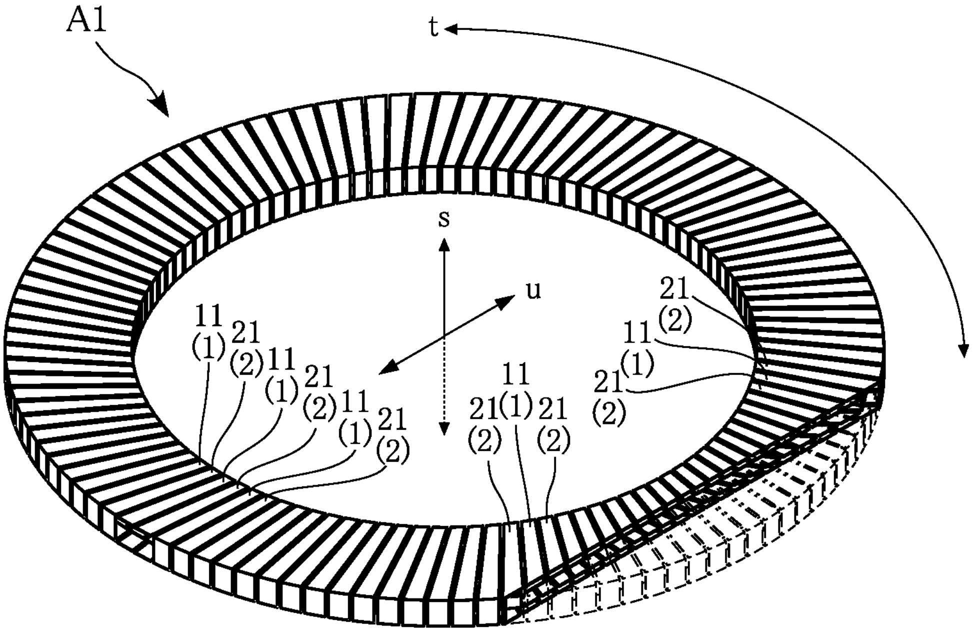
FIG. 5 is a perspective view corresponding to FIG. 1 but partially cut away along the cutting plane shown in FIG. 4 (i.e., along line IV-IV in FIG. 3)
Figure 6:
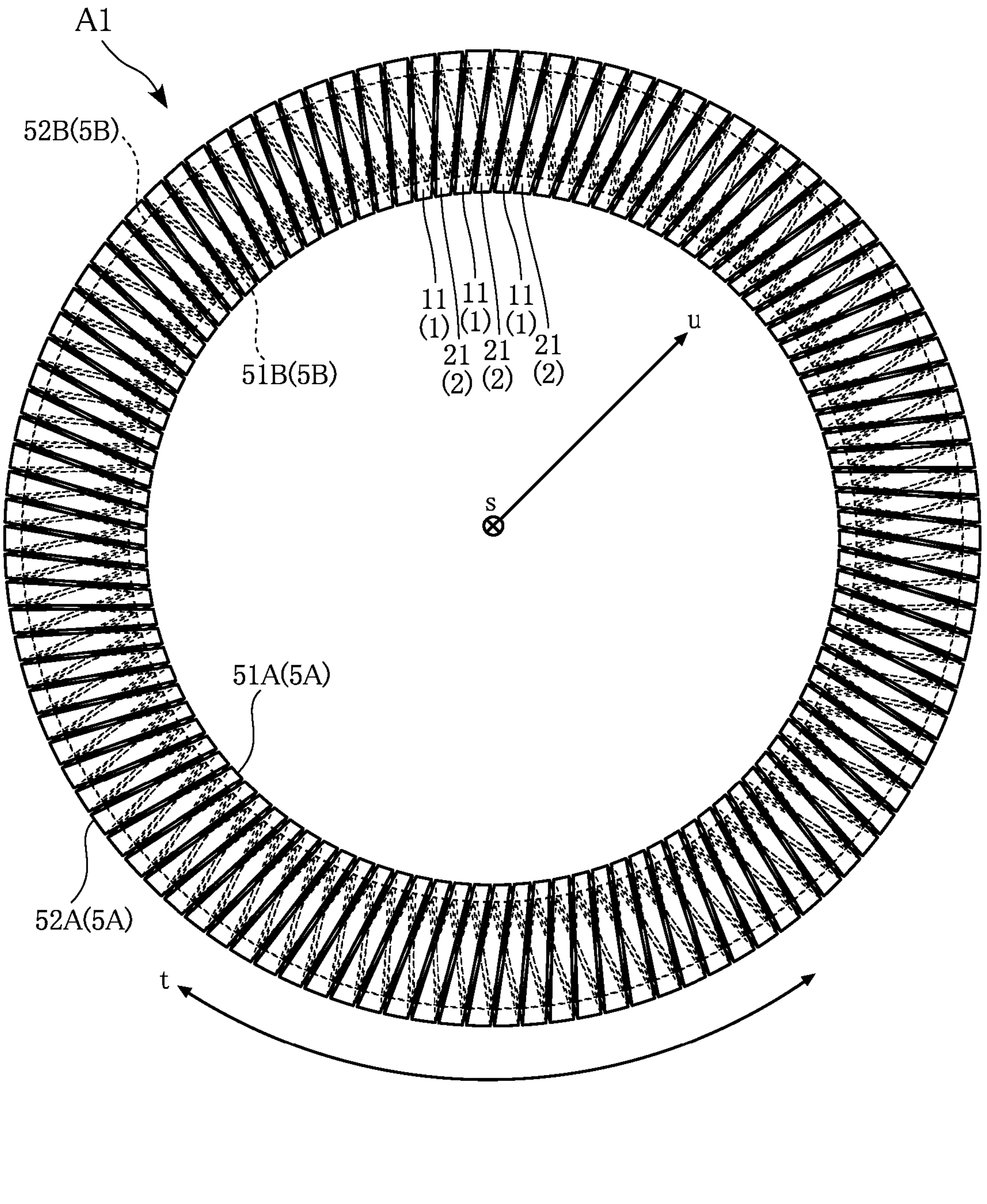
FIG. 6 is a bottom view showing the coil component according to the first embodiment.
Figure 7:
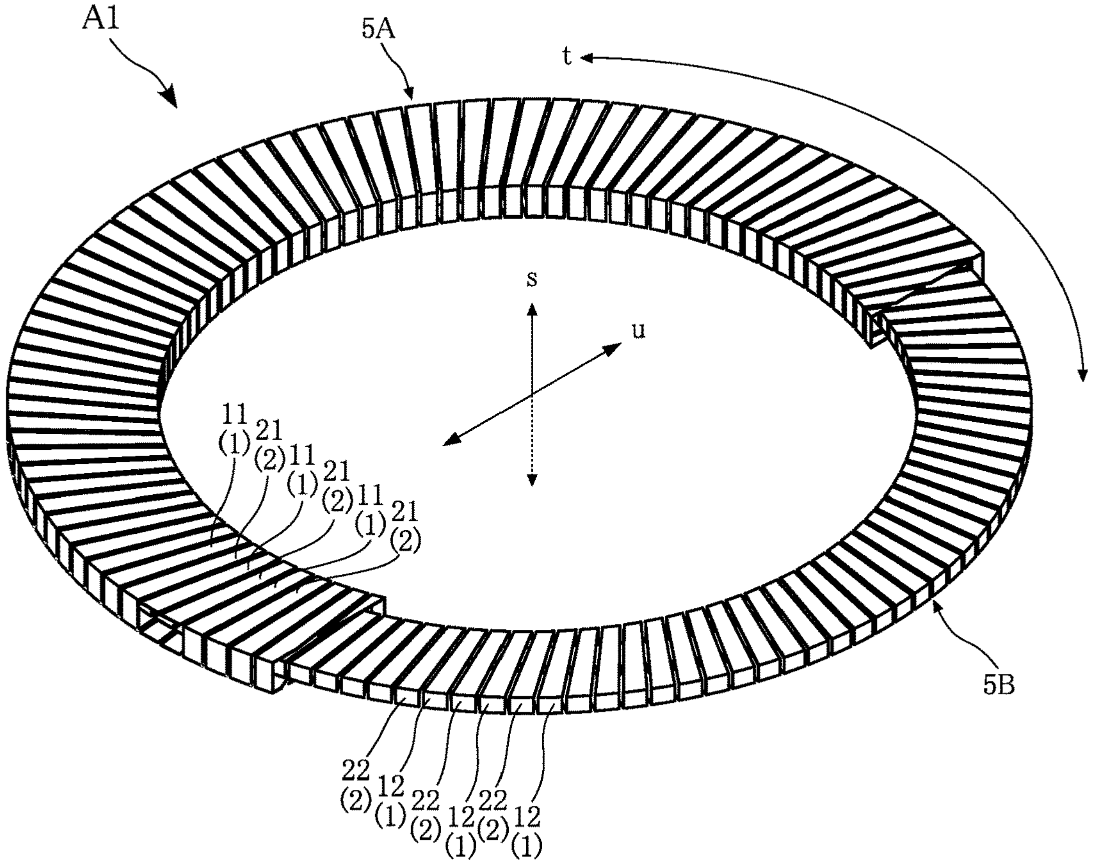
FIG. 7 is a view provided by omitting a part (a part of a first tubular portion) from the perspective view shown in FIG. 1.
Figure 8:
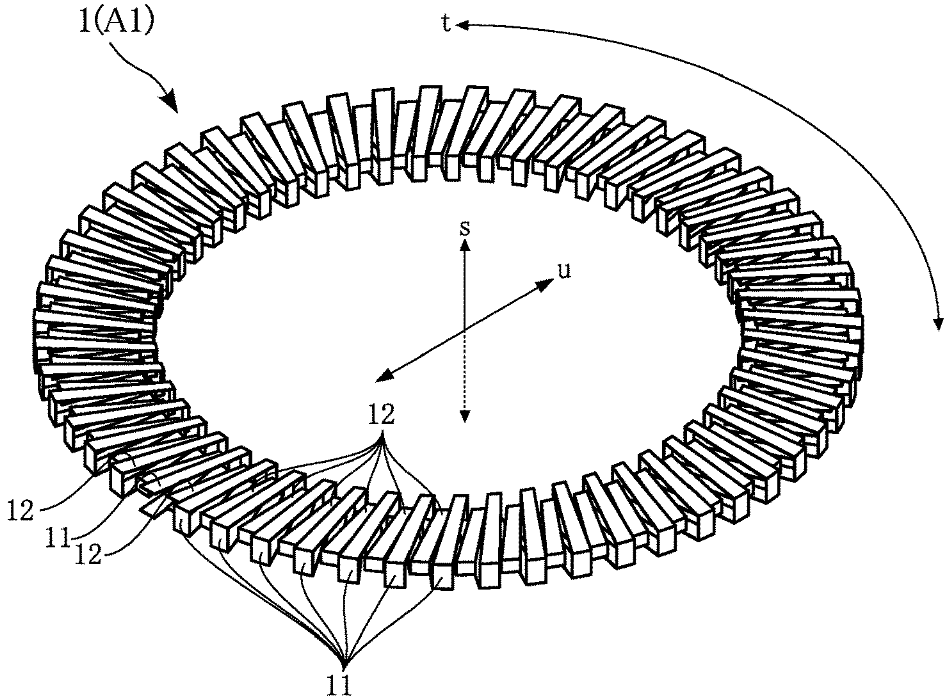
FIG. 8 is a perspective view showing a primary winding of the coil component according to the first embodiment.
Figure 9:
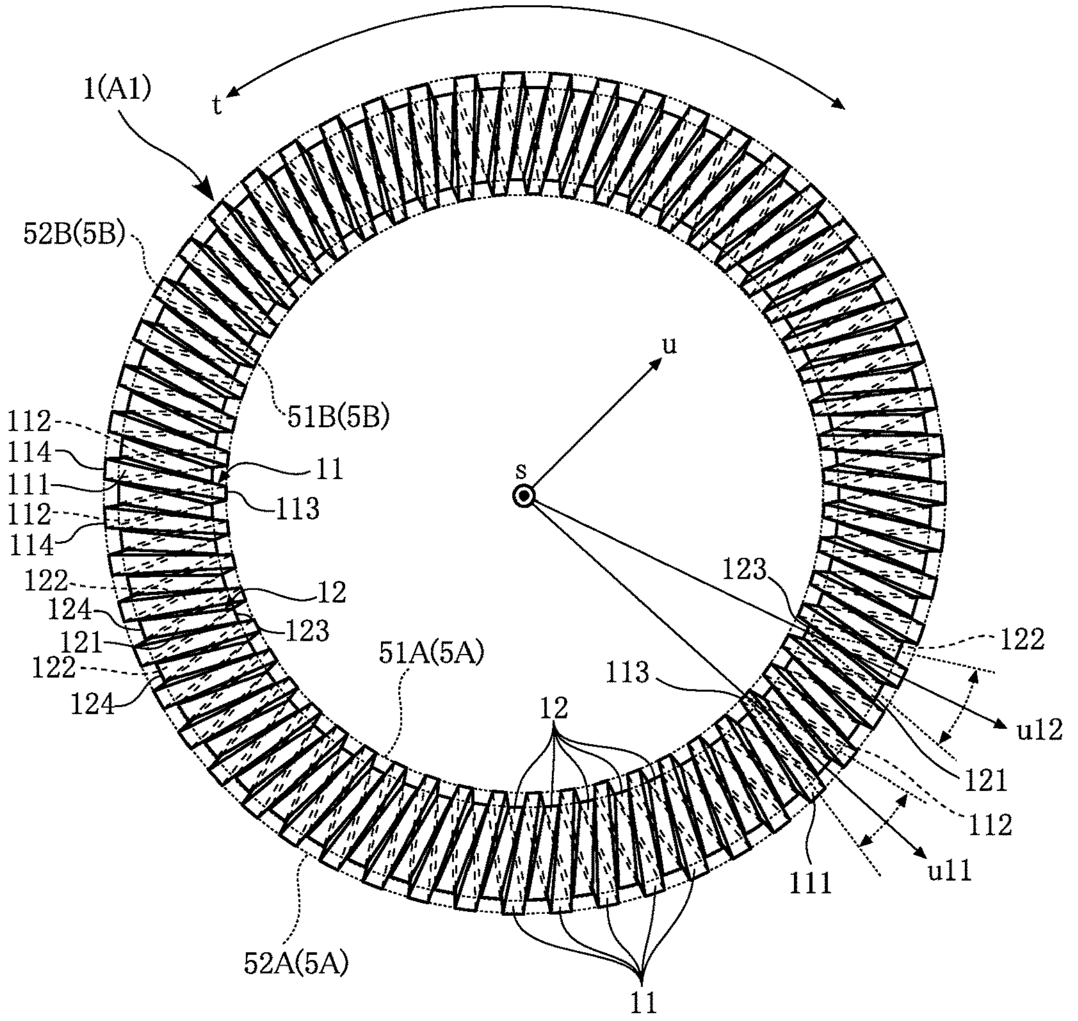
FIG. 9 is a plan view showing primary winding of the coil component according to the first embodiment.
Figure 10:
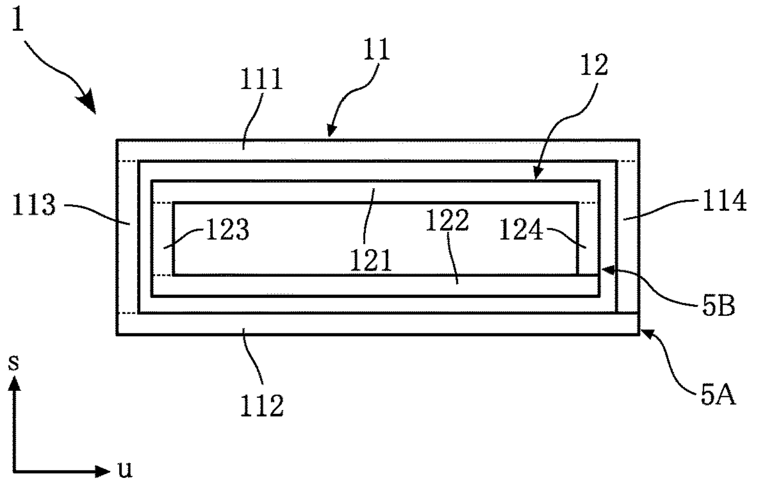
FIG. 10 is a schematic view of the primary winding shown in FIGS. 8 and 9, as viewed along a circumferential direction.
Figure 11:
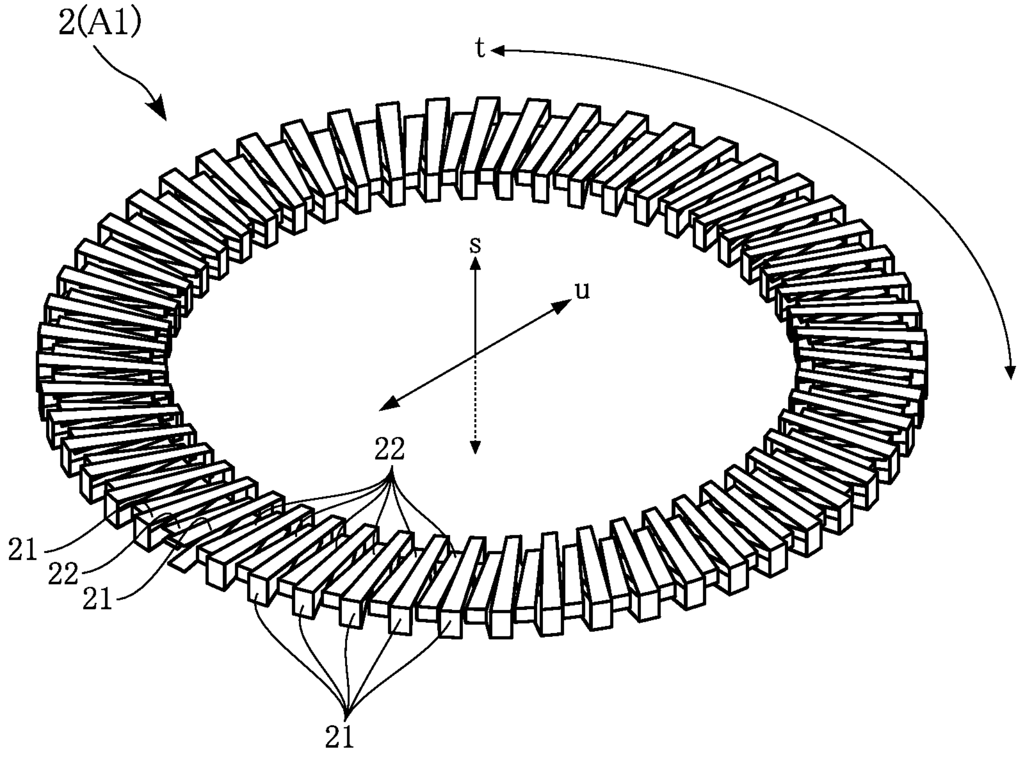
FIG. 11 is a perspective view showing a secondary winding of the coil component according to the first embodiment.
Figure 12:
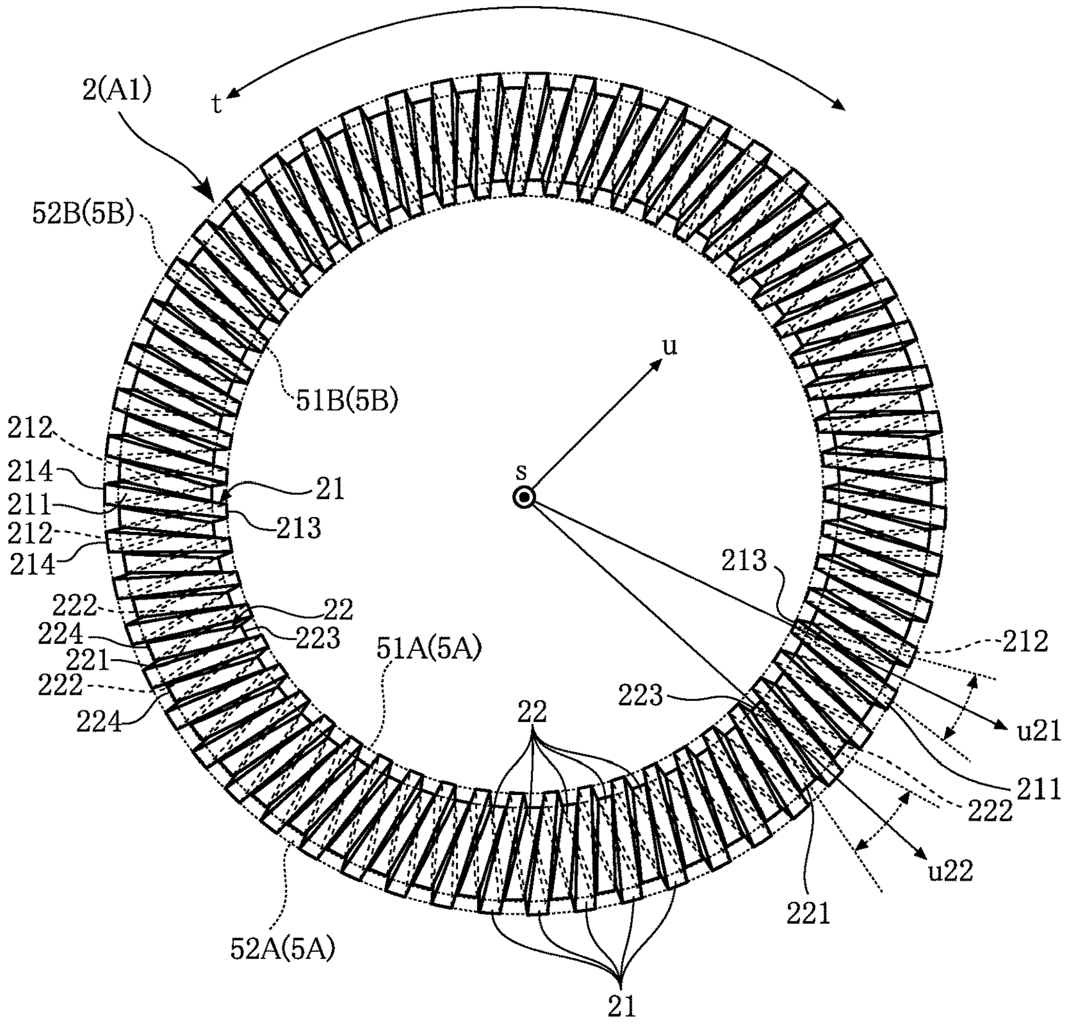
FIG. 12 is a plan view showing a secondary winding of the coil component according to the first embodiment.
Figure 13:
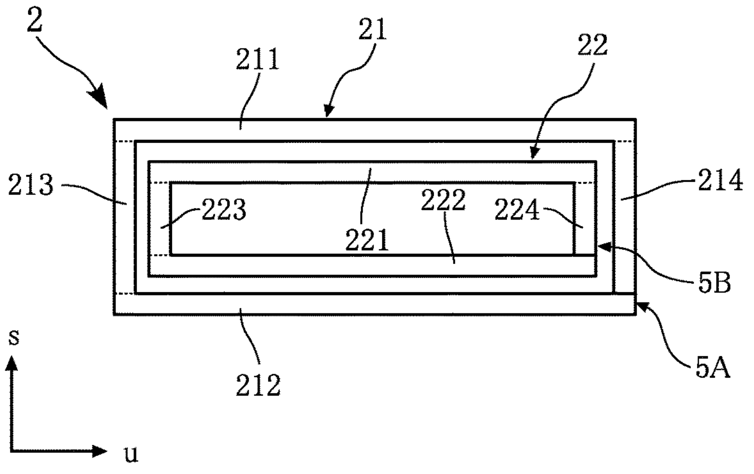
FIG. 13 is a schematic view of the secondary winding shown in FIGS. 11 and 12, as viewed along the circumferential direction.
Figure 14:
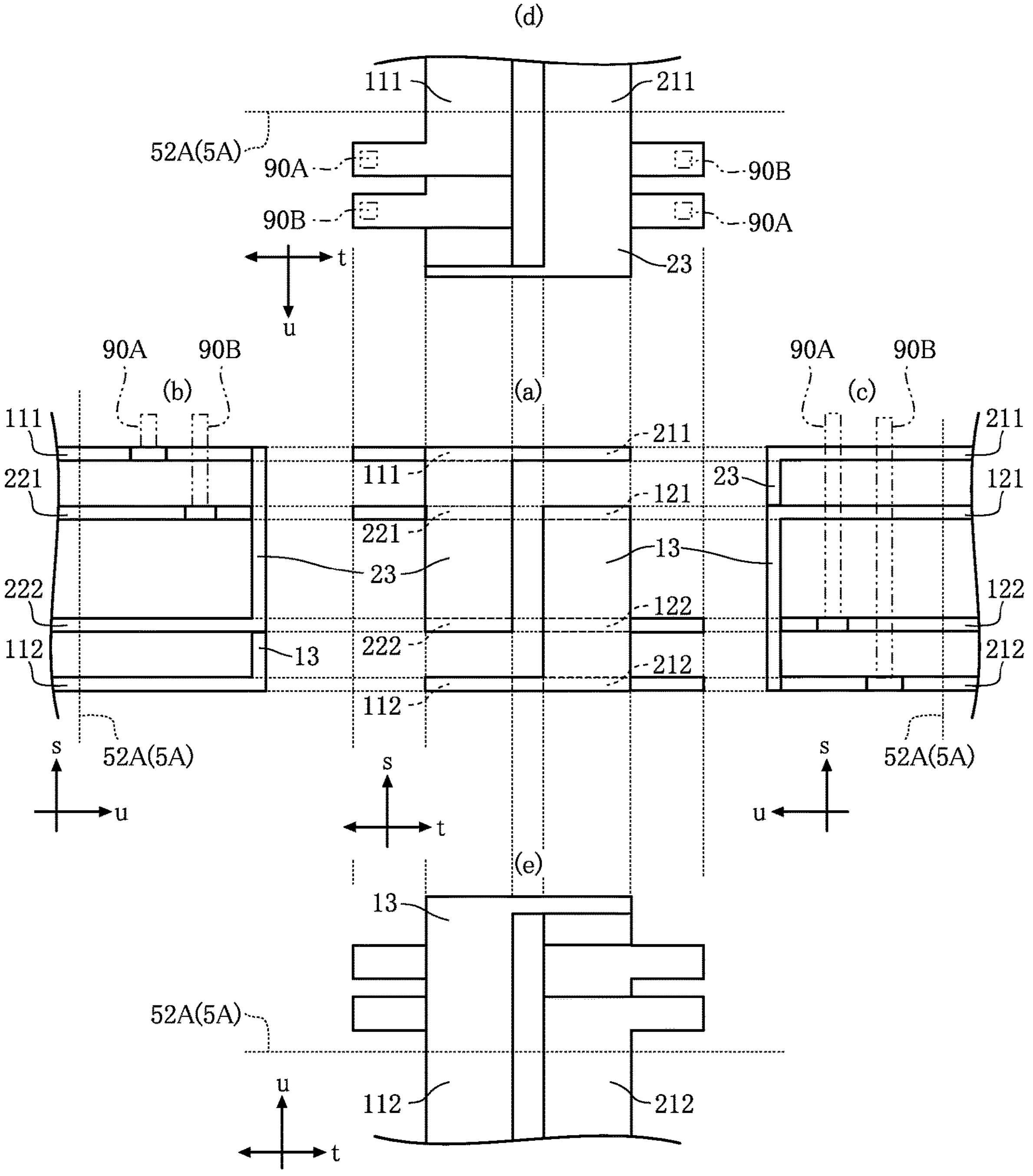
FIG. 14 is a schematic view showing a part of the primary winding and a part of the secondary winding, illustrating an example of connection by each connecting portion.

FIG. 1 is a perspective view showing the coil component A1. FIG. 2 is an enlarged view showing a part of FIG. 1. FIG. 3 is a plan view showing the coil component A1. FIG. 4 is a cut end view along line IV-IV in FIG. 3. FIG. 5 is a perspective view corresponding to FIG. 1 but partially cut away along the cutting plane shown in FIG. 4 (i.e., along line IV-IV in FIG. 3). In FIG. 5, the cut portion is shown by imaginary lines (two-dot chain lines). FIG. 6 is a bottom view showing the coil component A1. FIG. 7 is a view provided by omitting a part (a part of a first tubular portion 5A, described later) from the perspective view shown in FIG. 1. FIG. 8 is a perspective view showing the primary winding 1 of the coil component A1. FIG. 9 is a plan view showing the primary winding 1 of the coil component A1. FIG. 10 is a schematic view of the primary winding 1 shown in FIGS. 8 and 9, as viewed along the circumferential direction t. FIG. 11 is a perspective view showing the secondary winding 2 of the coil component A1. FIG. 12 is a plan view showing the secondary winding 2 of the coil component A1. FIG. 13 is a schematic view of the secondary winding 2 shown in FIGS. 11 and 12, as viewed along the circumferential direction t. FIG. 14 is a schematic view showing a part of the primary winding 1 and a part of the secondary winding 2, illustrating examples of connection by a connecting portion 13 (described later) and a connecting portion 23 (described later). Note that connecting portions 13 and 23 are omitted in FIGS. 1 to 13. FIG. 14(*a*) is a view as seen from the outside to the inside in the radial direction u, FIG. 14(*b*) and FIG. 14(*c*) are views as seen from opposite sides in the circumferential direction t, and FIG. 14(*d*) and FIG. 14(*e*) are views as seen from opposite sides in the axial direction s.

In the coil component A1, the primary winding 1 and the secondary winding 2 are alternately and doubly wound. By doubly winding each of the primary winding 1 and the secondary winding 2, the coil component A1 includes a first tubular portion 5A and a second tubular portion 5B. Each of the first tubular portion 5A and the second tubular portion 5B has a toroidal shape. As shown in FIG. 7, the second tubular portion 5B is located inside the first tubular portion 5A. The first tubular portion 5A defines the outer periphery of the coil component A1. The first tubular portion 5A and the second tubular portion 5B are annular in plan view, for example, and have a common central axis. That is, the central axis of the first tubular portion 5A in plan view and the central axis of the second tubular portion 5B in plan view generally correspond to each other. The direction in which the central axis extends is the axial direction s. The cross-sectional shape of each of the first tubular portion 5A and the second tubular portion 5B is a rectangular ring, for example.

The primary winding 1 generates a magnetic field by the input current from the outside. As shown in FIGS. 8 to 10 and 14, the primary winding 1 includes a plurality of first turns 11, a plurality of second turns 13, and a connecting portion 13. The first turns 11 correspond to the "primary first turns", the second turns 12 correspond to the "primary second turns", and the connecting portion 13 corresponds to the "primary connecting portion".

As shown in FIG. 10, each of the first turns 11 has the shape of a rectangular ring, for example, as viewed along the circumferential direction t. As shown in FIG. 9, as viewed in the axial direction s, the first turns 11 are arranged side by side along the circumferential direction t. The first turns 11 are part of the first tubular portion 5A. As shown in FIG. 10, each of the first turns 11 has a first top-conductor portion 111, a first bottom-conductor portion 112, and a pair of first connecting-conductor portions 113 and 114. The first top-conductor portion 111 corresponds to the "primary first top-conductor portion", the first bottom-conductor portion 112 corresponds to the "primary first bottom-conductor portion", and the pair of first connecting-conductor portions 113 and 114 correspond to "a pair of primary first connecting-conductor portions".

In each of the first turns 11, the first top-conductor portion 111 and the first bottom-conductor portion 112 are spaced apart from each other in the axial direction s, as shown in FIG. 10. As shown in FIG. 9, as viewed in the axial direction s, each of the first top-conductor portions 111 and each of the first bottom-conductor portions 112 extend from the inner circumferential edge 51A of the first tubular portion 5A toward the outer circumferential edge 52A of the first tubular portion Each of the first top-conductor portions 111 and each of the first bottom-conductor portions 112 are in the form of a strip, as viewed in the axial direction s. As shown in FIG. 10, each of the pair of first connecting-conductor portions 113 and 114 extends from the first top-conductor portion 111 along the axial direction s. The first connecting-conductor portion 113 leads to the first bottom-conductor portion 112 of the same first turn 11. The first connecting-conductor portion 114 leads to the first bottom-conductor portion 112 of the first turn 11 adjacent in the circumferential direction t. Each of the pair of first connecting-conductor portions 113 and 114 is generally orthogonal to the first top-conductor portion 111 and the first bottom-conductor portion 112. The first connecting-conductor portion 113 overlaps with the inner circumferential edge 51A of the first tubular portion 5A as viewed in the axial direction s. The first connecting-conductor portion 114 overlaps with the outer circumferential edge 52A of the first tubular portion 5A as viewed in the axial direction s. Each of the pair of first connecting-conductor portions 113 and 114 is in the form of a strip elongated in the axial direction s, as viewed along the radial direction u.

In the present embodiment, each first top-conductor portion 111 is inclined in a first sense of the circumferential direction t with respect to the radial direction u, and each first bottom-conductor portion 112 is inclined in a second sense of the circumferential direction t with respect to the radial direction u. In the example shown in FIG. 9, assuming that the radial direction u pointing to each first connecting-conductor portion 113 is the radial direction u11, the first top-conductor portion 111 leading to the first connecting-conductor portion 113 is inclined clockwise in the circumferential direction t with respect to the radial direction u11. Each first bottom-conductor portion 112 leading to the relevant first connecting-conductor portion 113 is inclined counterclockwise in the circumferential direction t with respect to the radial direction u11. In this way, the first top-conductor portions 111 and the first bottom-conductor portions 112 are inclined in opposite senses of the circumferential direction t with respect to the radial direction u, which allows the first connecting-conductor portions 113 and 114 to be formed along the axial direction s.

In the present embodiment, two adjacent ones of the first top-conductor portions 111 in the circumferential direction t are disposed with a predetermined interval between them, so are two adjacent ones of the first bottom-conductor portion 112 in the circumferential direction t. The interval is approximately the same on the inner circumferential edge 51A side and on the outer circumferential edge 52A side of the first tubular portion 5A. With such an arrangement, as viewed in the axial direction s, the dimension of each first connecting-conductor portion 114 along the circumferential direction t is larger than the dimension of each first connecting-conductor portion 113 along the circumferential direction t.

Two adjacent ones of the plurality of first turns 11 in the circumferential direction t are directly connected to each other, so that the input current flowing in the primary winding 1 flows through the plurality of first turns 11 in sequence. At this time, the input current is transmitted to the first connecting-conductor portion 114 of each first turn 11 from the first bottom-conductor portion 112 of the adjacent first turn 11 located on a first side in the circumferential direction t. The input current then flows from the first connecting-conductor portion 114 to the first bottom-conductor portion 112 through the first top-conductor portion 111 and the first connecting-conductor portion 113. That is, in the example shown in FIG. 10, the input current flows counterclockwise through each first turn 11. The input current is then transmitted to the adjacent first turn 11 located on a second side in the circumferential direction t. In this way, the input current of the primary winding 1 circulates through each of the first turns 11. Note that the direction of the input current in the first turns 11 may be opposite to the above-described example. That is, the input current may be transmitted to the first bottom-conductor portion 112 of each first turn 11 from the first connecting-conductor portion 114 of the adjacent first turn 11 located on the second side in the circumferential direction t. The input current may then flow from the first bottom-conductor portion 112 to the first connecting-conductor portion 114 through the first connecting-conductor portion 113 and the first top-conductor portion 111. That is, in the example shown in FIG. 10, the input current may flow clockwise through each first turn 11.

As shown in FIG. 10, each of the second turns 12 has the shape of a rectangular ring, for example, as viewed along the circumferential direction t. As shown in FIG. 10, as viewed along the circumferential direction t, each second turn 12 is located inside each first turn 11. As shown in FIG. 9, as viewed in the axial direction s, the second turns 12 are arranged side by side along the circumferential direction t. The second turns 12 are part of the second tubular portion 5B. As shown in FIGS. 8 and 9, as viewed in the axial direction s, the first turns 11 and the second turns 12 are alternately arranged in the circumferential direction t. As shown in FIG. 10, each of the second turns 12 has a second top-conductor portion 121, a second bottom-conductor portion 122, and a pair of second connecting-conductor portions 123 and 124. The second top-conductor portion 121 corresponds to the “primary second top-conductor portion”, the second bottom-conductor portion 122 corresponds to the “primary second bottom-conductor portion”, and the pair of second connecting-conductor portions 123 and 124 correspond to “a pair of primary second connecting-conductor portions”.

In each of the second turns 12, the second top-conductor portion 121 and the second bottom-conductor portion 122 are spaced apart from each other in the axial direction s, as shown in FIG. 10. As shown in FIG. 9, as viewed in the axial direction s, each of the second top-conductor portions 121 and each of the second bottom-conductor portions 122 extend from the inner circumferential edge 51B of the second tubular portion 5B toward the outer circumferential edge 52B of the second tubular portion Each of the second top-conductor portions 121 and each of the second bottom-conductor portions 122 are in the form of a strip, as viewed in the axial direction s. As shown in FIG. 10, each of the pair of second connecting-conductor portions 123 and 124 extends from the second top-conductor portion 121 along the axial direction s. The second connecting-conductor portion 123 leads to the second bottom-conductor portion 122 of the same second turn 12. The second connecting-conductor portion 124 leads to the second bottom-conductor portion 122 of the second turn 12 adjacent in the circumferential direction t. Each of the pair of second connecting-conductor portions 123 and 124 is generally orthogonal to the second top-conductor portion 121 and the second bottom-conductor portion 122. The second connecting-conductor portion 123 overlaps with the inner circumferential edge 51B of the second tubular portion 5B as viewed in the axial direction s.

The second connecting-conductor portion 124 overlaps with the outer circumferential edge 52B of the second tubular portion 5B as viewed in the axial direction s. Each of the pair of second connecting-conductor portion 123 and 124 is in the form of a strip elongated in the axial direction s, as viewed along the radial direction u.

In the present embodiment, each second top-conductor portion 121 is inclined in the first sense of the circumferential direction t with respect to the radial direction u, and each second bottom-conductor portion 122 is inclined in the second sense of the circumferential direction t with respect to the radial direction u. In the example shown in FIG. 9, assuming that the radial direction u pointing to each second connecting-conductor portion 123 is the radial direction u12, the second top-conductor portion 121 leading to the second connecting-conductor portion 123 is inclined clockwise in the circumferential direction t with respect to the radial direction u12. Each second bottom-conductor portion 122 leading to the relevant second connecting-conductor portion 223 is inclined counterclockwise in the circumferential direction t with respect to the radial direction u12. In this way, the second top-conductor portions 121 and the second bottom-conductor portion 122 are inclined in opposite senses of the circumferential direction t with respect to the radial direction u, which allows the second connecting-conductor portions 123 and 124 to be formed along the axial direction s.

In the present embodiment, two adjacent ones of the second top-conductor portions 121 in the circumferential direction t are disposed with a predetermined interval between them, so are two adjacent ones of the second bottom-conductor portions 122 in the circumferential direction t. The interval is approximately the same on the inner circumferential edge 51B side and on the outer circumferential edge 52B side of the second tubular portion 5B. With such an arrangement, as viewed in the axial direction s, the dimension of each second connecting-conductor portion 124 along the circumferential direction t is larger than the dimension of each second connecting-conductor portion 123 along the circumferential direction t.

Two adjacent ones of the plurality of second turns 12 in the circumferential direction t are directly connected to each other, so that the input current flowing in the primary winding 1 flows through the plurality of second turns 12 in sequence. At this time, the input current is transmitted to the second connecting-conductor portion 124 of each second turn 12 from the second bottom-conductor portion 122 of the adjacent second turn 12 located on the first side in the circumferential direction t. The input current then flows from the second connecting-conductor portion 124 to the second bottom-conductor portion 122 through the second top-conductor portion 121 and the second connecting-conductor portion 123. That is, in the example shown in FIG. 10, the input current flows counterclockwise through each second turn 12. Thus, the direction of the input current in the first turns 11 and the direction of the input current in the second turns 12 are the same, as viewed along the circumferential direction t. In this way, the input current of the primary winding 1 circulates through each of the second turns 12. Note that the direction of the input current in the second turns 12 may be opposite to the above-described example. That is, the input current may be transmitted to the second bottom-conductor portion 122 of each second turn 12 from the second connecting-conductor portion 124 of the adjacent second turns 12 located on the second side in the circumferential direction t. The input current may then flow from the second bottom-conductor portion 122 to the second connecting-conductor portion 124 through the second connecting-conductor portion 123 and the second top-conductor portion 121. That is, in the example shown in FIG. 10, the input current may flow clockwise through each second turn 12. Note however that the direction of the input current through each first turn 11 and the direction of the input current through each second turn 12 should be the same, as viewed along the circumferential direction t.

The connecting portion 13 connects one of the first turns 11 and one of the second turns 12 to each other. For example, as shown in FIG. 14, the connecting portion 13 is connected to the first bottom-conductor portion 112 of one of the first turns 11 and the second top-conductor portion 121 of one of the second turns 12 to electrically connect these.

The primary winding 1 includes the first turns 11 connected continuously along the circumferential direction t, and the second turns 12 connected continuously along the circumferential direction t. The first turns and the second turns are connected by the connecting portion 13. With such an arrangement, the input current of the primary winding 1 first circulates through the first turns 11, and then inputted through the connecting portion 13 to the second turns 12 to circulate through the second turns 12.

Due to the magnetic field generated by the primary winding 1, an induced current flows in the secondary winding 2. As shown in FIGS. 11 to 14, the secondary winding 2 includes a plurality of first turns 21, a plurality of second turns 22, and a connecting portion 23. The first turns 21 correspond to the "secondary first turns", the second turns 22 correspond to the "secondary second turns", and the connecting portion 23 corresponds to the "secondary connecting portion".

As shown in FIG. 13, each of the first turns 21 has the shape of a rectangular ring, for example, as viewed along the circumferential direction t. As shown in FIG. 12, as viewed in the axial direction s, the first turns 21 are arranged side by side along the circumferential direction t. The first turns 21 are part of the first tubular portion 5A. Each of the first turns 21 has a first top-conductor portion 211, a first bottom-conductor portion 212, and a pair of first connecting-conductor portions 213 and 214. The first top-conductor portion 211 corresponds to the "secondary first top-conductor portion", the first bottom-conductor portion 212 corresponds to the "secondary first bottom-conductor portion", and the pair of first connecting-conductor portions 213 and 214 correspond to "a pair of secondary first connecting-conductor portions".

In each of the first turns 21, the first top-conductor portion 211 and the first bottom-conductor portion 212 are spaced apart from each other in the axial direction s, as shown in FIG. 13. As shown in FIG. 12, as viewed in the axial direction s, each of the first top-conductor portions 211 and each of the first bottom-conductor portions 212 extend from the inner circumferential edge 51A of the first tubular portion 5A toward the outer circumferential edge 52A of the first tubular portion 5A. Each of the first top-conductor portions 211 and each of the first bottom-conductor portion 212 are in the form of a strip, as viewed in the axial direction s. As shown in FIG. 13, each of the pair of first connecting-conductor portions 213 and 214 extends from the first top-conductor portion 211 along the axial direction s. The first connecting-conductor portion 213 leads to the first bottom-conductor portion 212 of the same first turn 21. The first connecting-conductor portion 214 leads to the first bottom-conductor portion 212 of the first turn 21 adjacent in the circumferential direction t. Each of the pair of first connecting-conductor portions 213 and 214 is generally orthogonal to the first top-conductor portion 211 and the first bottom-conductor portion 212. The first connecting-conductor portion 213 overlaps with the inner circumferential edge 51A of the first tubular portion 5A as viewed in the axial direction s. The first connecting-conductor portion 214 overlaps with the outer circumferential edge 52A of the first tubular portion 5A as viewed in the axial direction s. Each of the pair of first connecting-conductor portions 213 and 214 is in the form of a strip elongated in the axial direction s, as viewed along the radial direction u.

In the present embodiment, each first top-conductor portion 211 is inclined in the first sense of the circumferential direction t with respect to the radial direction u, and each first bottom-conductor portion 212 is inclined in the second sense of the circumferential direction t with respect to the radial direction u. In the example shown in FIG. 12, assuming that the radial direction u pointing to each first connecting-conductor portion 213 is the radial direction u21, the first top-conductor portion 211 leading to the first connecting-conductor portion 213 is inclined clockwise in the circumferential direction t with respect to the radial direction u21. Each first bottom-conductor portion 212 leading to the relevant first connecting-conductor portion 213 is inclined counterclockwise in the circumferential direction t with respect to the radial direction u21. In this way, the first top-conductor portions 211 and the first bottom-conductor portions 212 are inclined in opposite senses of the circumferential direction t with respect to the radial direction u, which allows the first connecting-conductor portions 213 and 214 to be formed along the axial direction s.

In the present embodiment, two adjacent ones of the first top-conductor portions 211 in the circumferential direction t are disposed with a predetermined interval between them, so are two adjacent ones of the first bottom-conductor portions 212 in the circumferential direction t. The interval is approximately the same on the inner circumferential edge 51A side and on the outer circumferential edge 52A side. With such an arrangement, as viewed in the axial direction s, the dimension of each first connecting-conductor portion 214 along the circumferential direction t is larger than the dimension of each first connecting-conductor portion 213 along the circumferential direction t.

Two adjacent ones of the plurality of first turns 21 in the circumferential direction t are directly connected to each other, so that the induced current in the secondary winding 1 flows through the plurality of first turns 21 in sequence. At this time, the induced current is transmitted to the first connecting-conductor portion 214 of each first turn 21 from the first bottom-conductor portion 212 of the adjacent first turn 21 located on the first side in the circumferential direction t. The induced current then flows from the first connecting-conductor portion 214 to the first bottom-conductor portion 212 through the first top-conductor portion 211 and the first connecting-conductor portion 213. That is, in the example shown in FIG. 13, the induced current flows counterclockwise through each first turn 21. The induced current is then transmitted to the adjacent first turn 21 located on the second side in the circumferential direction t. In this way, the induced current of the secondary winding 2 circulates through each of the first turns 21. Note that the direction of the induced current in the first turns 21 may be opposite to the above-described example. That is, the induced current may be transmitted to the first bottom-conductor portion 212 of each first turn 21 from the first connecting-conductor portion 214 of the adjacent first turn 21 located on the second side in the circumferential direction t. The induced current may then flow from the first bottom-conductor portion 212 to the first connecting-conductor portion 214 through the first connecting-conductor portion 213 and the first top-conductor portion 211. That is, in the example shown in FIG. 13, the induced current may flow clockwise through each first turn 21. The direction of the induced current in the first turns 21 is determined by the magnetic field generated by the primary winding 1.

As shown in FIG. 13, each of the second turns 22 has the shape of a rectangular ring, for example, as viewed along the circumferential direction t. As shown in FIG. 13, as viewed along the circumferential direction t, each second turn 22 is located inside each first turn 21. As shown in FIG. 12, as viewed in the axial direction s, the second turns 22 are arranged side by side along the circumferential direction t. The second turns 22 are part of the second tubular portion 5B. As shown in FIGS. 11 and 12, as viewed in the axial direction s, the first turns 21 and the second turns 22 are alternately arranged in the circumferential direction t. As shown in FIG. 13, each of the second turns 22 has a second top-conductor portion 221, a second bottom-conductor portion 222, and a pair of second connecting-conductor portions 223 and 224. The second top-conductor portion 221 corresponds to the "secondary second top-conductor portion", the second bottom-conductor portion 222 corresponds to the "secondary second bottom-conductor portion", and the pair of second connecting-conductor portions 223 and 224 correspond to "a pair of secondary second connecting-conductor portions".

In each of the second turns 22, the second top-conductor portion 221 and the second bottom-conductor portion 222 are spaced apart from each other in the axial direction s, as shown in FIG. 13. As shown in FIG. 12, as viewed in the axial direction s, each of the second top-conductor portions 221 and each of the second bottom-conductor portions 222 extend from the inner circumferential edge 51B of the second tubular portion 5B toward the outer circumferential edge 52B of the second tubular portion 5B. Each of the second top-conductor portions 221 and each of the second bottom-conductor portions 222 are in the form of a strip, as viewed in the axial direction s. As shown in FIG. 13, each of the pair of second connecting-conductor portions 223 and 214 extends from the second top-conductor portion 221 along the axial direction s. The second connecting-conductor portion 223 leads to the second bottom-conductor portion 222 of the same second turn 22. The second connecting-conductor portion 224 leads to the second bottom-conductor portion 222 of the second turn 22 adjacent in the circumferential direction t. Each of the pair of second connecting-conductor portions 223 and 224 is generally orthogonal to the second top-conductor portion 221 and the second bottom-conductor portion 222. The second connecting-conductor portion 223 overlaps with the inner circumferential edge 51B of the second tubular portion 5B as viewed in the axial direction s. The second connecting-conductor portion 224 overlaps with the outer circumferential edge 52B of the second tubular portion 5B as viewed in the axial direction s. Each of the pair of second connecting-conductor portions 223 and 224 is in the form of a strip elongated in the axial direction s, as viewed along the radial direction u.

In the present embodiment, each second top-conductor portion 221 is inclined in the first sense of the circumferential direction t with respect to the radial direction u, and each second bottom-conductor portion 222 is inclined in the second sense of the circumferential direction t with respect to the radial direction u. In the example shown in FIG. 12, assuming that the radial direction u pointing to each second connecting-conductor portion 223 is the radial direction u22, the second top-conductor portion 221 leading to the second connecting-conductor portion 223 is inclined clockwise in the circumferential direction t with respect to the radial direction u22. Each second bottom-conductor portion 222 leading to the relevant second connecting-conductor portion 223 is inclined counterclockwise in the circumferential direction t with respect to the radial direction u22. In this way, the second top-conductor portion 221 and the second bottom-conductor portion 222 are inclined in opposite senses of the circumferential direction t with respect to the radial direction u, which allows the second connecting-conductor portions 223 and 224 to be formed along the axial direction s.

In the present embodiment, two adjacent ones of the second top-conductor portions 221 in the circumferential direction t are disposed with a predetermined interval between them, so are two adjacent ones of the second bottom-conductor portions 222 in the circumferential direction t. The interval is approximately the same on the inner circumferential edge 51B side and on the outer circumferential edge 52B side. With such an arrangement, as viewed in the axial direction s, the dimension of each second connecting-conductor portion 224 along the circumferential direction t is larger than the dimension of each second connecting-conductor portion 223 along the circumferential direction t.

Two adjacent ones of the plurality of second turns 22 in the circumferential direction t are directly connected to each other, so that the induced current in the secondary winding 2 flows through the plurality of second turns 22 in sequence. At this time, the induced current is transmitted to the second connecting-conductor portion 224 of each second turn 22 from the second bottom-conductor portion 222 of the adjacent second turn 22 located on the first side in the circumferential direction t. The induced current then flows from the second connecting-conductor portion 224 to the second bottom-conductor portion 222 through the second top-conductor portion 221 and the second connecting-conductor portion 223. That is, in the example shown in FIG. 13, the induced current flows counterclockwise through each second turn 22. Thus, the direction of the induced current in the first turns 21 and the direction of the induced current in the second turns 22 are the same, as viewed along the circumferential direction t. In this way, the induced current of the secondary winding 2 circulates through each of the second turns 22. Note that the direction of the induced current in the second turns 22 may be opposite to the above-described example. That is, the induced current may be transmitted to the second bottom-conductor portion 222 of each second turn 22 from the second connecting-conductor portion 224 of the adjacent second turn 22 located on the second side in the circumferential direction t. The induced current may then flow from the second bottom-conductor portion 222 to the second connecting-conductor portion 224 through the second connecting-conductor portion 223 and the second top-conductor portion 221. That is, in the example shown in FIG. 13, the induced current may flow clockwise through each second turn 22. Note however that the direction of the induced current through each first turn 21 and the direction of the induced current through each second turn 22 should be the same, as viewed along the circumferential direction t.

The connecting portion 23 connects one of the first turns 21 and one of the second turns 22 to each other. For example, as shown in FIG. 14, the connecting portion 23 is connected to the first top-conductor portion 211 of one of the first turns 21 and the second bottom-conductor portion 222 of one of the second turns 22 to electrically connect these.

The secondary winding 2 includes the first turns 21 connected continuously along the circumferential direction t, and the second turns 22 connected continuously along the circumferential direction t. The first turns and the second turns are connected by the connecting portion 23. With such an arrangement, the induced current of the secondary winding 2 first circulates through the first turns 21, and then inputted through the connecting portion 23 to the second turns 22 to circulate through the second turns 22.

In the coil component A1, the first turns 11 (the primary winding 1) and the first turns 21 (the secondary winding 2) are alternately arranged in the circumferential direction t, forming the first tubular portion 5A. Also, the second turns 12 (the primary winding 1) and the second turns 22 (the secondary winding 2) are alternately arranged in the circumferential direction t, forming the second tubular portion 5B. The second tubular portion 5B is located inside the first tubular portion 5A.

As shown in FIGS. 3 to 7, in the coil component A1, the first turns 11 of the primary winding 1 and the first turns 21 of the secondary winding 2 overlap with each other as viewed in the circumferential direction t. That is, as viewed in the circumferential direction t, the first top-conductor portions 111 and the first top-conductor portions 211 overlap with each other, the first bottom-conductor portions 112 and the first bottom-conductor portions 212 overlap with each other, the first connecting-conductor portions 113 and the first connecting-conductor portions 213 overlap with each other, and the first connecting-conductor portion 114 and the first connecting-conductor portions 214 overlap with each other. Also, as shown in FIGS. 3 to 7, the second turns 12 of the primary winding 1 and the second turns 22 of the secondary winding 2 overlap with each other as viewed in the circumferential direction t. That is, as viewed in the circumferential direction t, the second top-conductor portions 121 and the second top-conductor portions 221 overlap with each other, the second bottom-conductor portions 122 and the second bottom-conductor portions 222 overlap with each other, the second connecting-conductor portions 123 and the second connecting-conductor portions 223 overlap with each other, and the second connecting-conductor portions 124 and the second connecting-conductor portions 224 overlap with each other.

As shown in FIGS. 3 to 7, in the coil component A1, each of the first turns 11 of the primary winding 1 partially overlaps with one of the second turns 22 of the secondary winding 2 both as viewed in the axial direction s and as viewed in the radial direction u. That is, as viewed in the axial direction s, each of the first top-conductor portions 111 overlaps with one of the second top-conductor portions 221, and each of the first bottom-conductor portions 112 overlaps with one of the second bottom-conductor portions 222. As viewed in the radial direction u, each of the first connecting-conductor portions 113 overlaps with one of the second connecting-conductor portions 223, and each of the first connecting-conductor portions 114 overlaps with one of the second connecting-conductor portions 224. Also, as shown in FIGS. 3 to 7, each of the second turns 12 of the primary winding 1 partially overlaps with one of the first turns 21 of the secondary winding 2 both as viewed in the axial direction s and as viewed in the radial direction u. That is, as viewed in the axial direction s, each of the second top-conductor portion 121 overlaps with one of the first top-conductor portions 211, and each of the second bottom-conductor portions 122 overlaps with one of the first bottom-conductor portions 212. As viewed in the radial direction u, each of the second connecting-conductor portions 123 overlaps with one of the first connecting-conductor portions 213, and each of the second connecting-conductor portions 124 overlaps with one of the first connecting-conductor portions 214.

Figure 15:
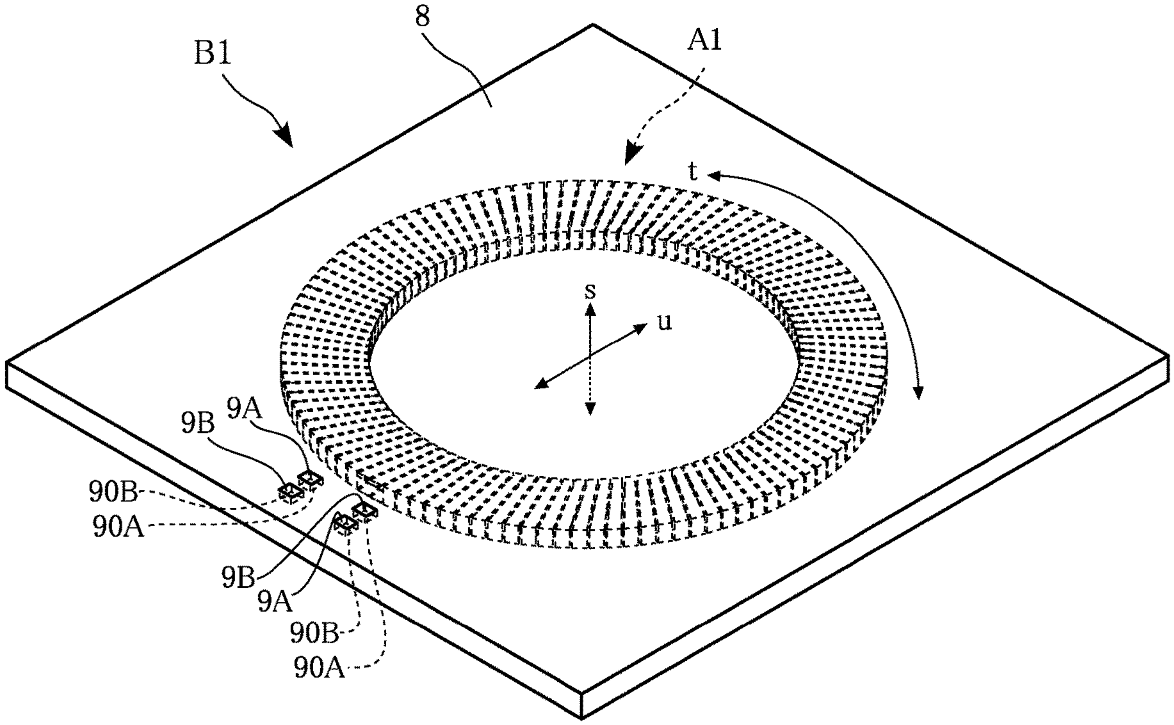
FIG. 15 is a perspective view showing a coil built-in substrate according to the first embodiment.
Figure 16:
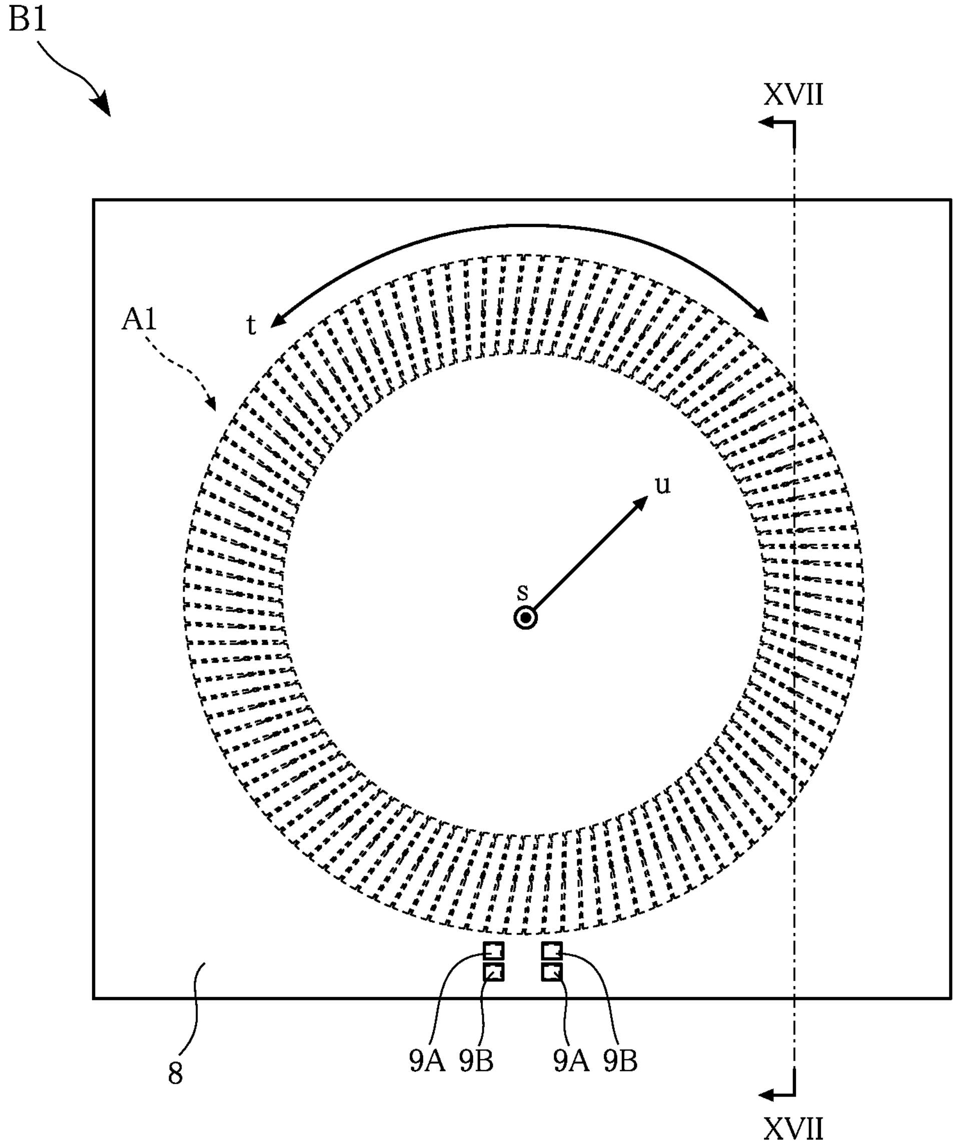
FIG. 16 is a plan view showing the coil built-in substrate according to the first embodiment.
Figure 17:
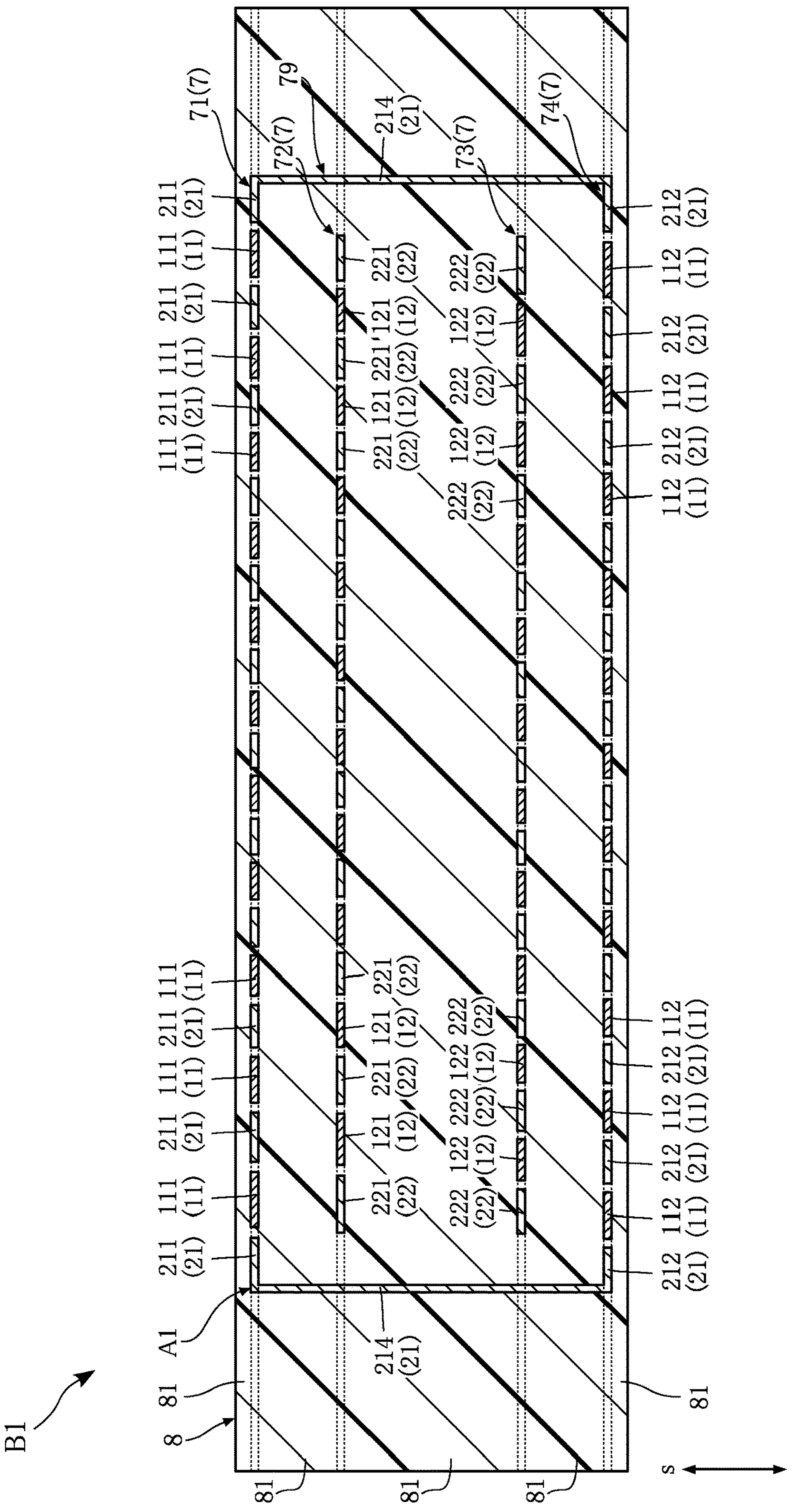
FIG. 17 is a sectional view taken along line XVII-XVII in FIG. 16.

A coil built-in substrate B1 incorporating the coil component A1 is described below with reference to FIGS. 15 to 17. FIG. 15 is a perspective view showing the coil built-in substrate B1. FIG. 16 is a plan view showing the coil built-in substrate B1. FIG. 17 is a sectional view taken along line XVII-XVII in FIG. 16.

The coil built-in substrate B1 is, for example, a printed circuit board. The coil built-in substrate B1 is not limited to a printed circuit board and may be a semiconductor substrate or a ceramic substrate. The coil built-in substrate B1 incorporates the coil component A1. The coil built-in substrate B1 may be rectangular in plan view. The coil built-in substrate B1 includes a plurality of interconnect layers 7, a plurality of through electrodes 79, an insulating member 8, and a plurality of terminals 9A and 9B.

Each of the interconnect layers 7 may be made of metal. For example, the material of each interconnect layer 7 may be copper (Cu) or copper alloy. The material is not limited to Cu or Cu alloy. The interconnect layers 7 include a first interconnect layer 71, a second interconnect layer 72, a third interconnect layer 73 and a fourth interconnect layer 74.

The first interconnect layer 71, the second interconnect layer 72, the third interconnect layer 73 and the fourth interconnect layer 74 are disposed in this order from a first side (the upper side in FIG. 17) toward a second side (the lower side in FIG. 17) in the axial direction s in a mutually spaced manner. The first interconnect layer 71, the second interconnect layer 72, the third interconnect layer 73 and the fourth interconnect layer 74 each have an interconnect pattern.

The interconnect pattern of the first interconnect layer 71 provides the first top-conductor portions 111 (the first turns 11 of the primary winding 1) and the first top-conductor portions 211 (the first turns 21 of the secondary winding 2).

The interconnect pattern of the second interconnect layer 72 provides the second top-conductor portions 121 (the second turns 12 of the primary winding 1) and the second top-conductor portions 221 (the second turns 22 of the secondary winding 2).

The interconnect pattern of the third interconnect layer 73 provides the second bottom-conductor portions 122 (the second turns 12 of the primary winding 1) and the second bottom-conductor portions 222 (the second turns 22 of the secondary winding 2).

The interconnect pattern of the fourth interconnect layer 74 provides the first bottom-conductor portions 112 (the first turns 11 of the primary winding 1) and the first bottom-conductor portions 212 (the first turns 21 of the secondary winding 2).

As shown in FIG. 17, the distance separating the first interconnect layer 71 and the second interconnect layer 72 in the axial direction s is approximately the same as the distance separating the third interconnect layer 73 and the fourth interconnect layer 74 in the axial direction s. The distance separating the second interconnect layer 72 and the third interconnect layer 73 in the axial direction s is larger than each of the distance separating the first interconnect layer 71 and the second interconnect layer 72 in the axial direction s and the distance separating the third interconnect layer 73 and the fourth interconnect layer 74 in the axial direction s. With such an arrangement, in the primary winding 1 of the coil component A1, the distance separating the first top-conductor portions 111 and the second top-conductor portions 121 in the axial direction s is approximately the same as the distance separating the second bottom-conductor portions 122 and the first bottom-conductor portions 112 in the axial direction s. The distance separating the second top-conductor portions 121 and the second bottom-conductor portions 122 in the axial direction s is larger than each of the distance separating the first top-conductor portions 111 and the second top-conductor portions 121 in the axial direction s and the distance separating the second bottom-conductor portions 122 and the first bottom-conductor portions 112 in the axial direction s. These hold true for the secondary winding 2 of the coil component A1.

The through electrodes 79 extend through a part of the insulating member 8 in the axial direction s. In the present embodiment, each through electrode 79 may be columnar. The through electrodes 79 include those electrically connecting the first interconnect layer 71 and the fourth interconnect layer 74 and those electrically connecting the second interconnect layer 72 and the third interconnect layer 73. The through electrodes 79 electrically connecting the first interconnect layer 71 and the fourth interconnect layer 74 provide pairs of first connecting-conductor portions 113 and 114 (the first turns 11 of the primary winding 1) and pairs of first connecting-conductor portions 213 and 214 (the first turns 21 of the secondary winding 2). The through electrodes 79 electrically connecting the second interconnect layer 72 and the third interconnect layer 73 provide pairs of second connecting-conductor portions 123 and 124 (the second turns 12 of the primary winding 1) and pairs of second connecting-conductor portions 223 and 224 (the second turns 22 of the secondary winding 2).

In the coil built-in substrate B1, the interconnect patterns of the interconnect layers 7 (the first interconnect layer 71, the second interconnect layer 72, the third interconnect layer 73 and the fourth interconnect layer 74) and the through electrodes 79 constitute the coil component A1.

As shown in FIGS. 15 to 17, the insulating member 8 covers the coil component A1. The insulating member 8 may be made of an insulating resin such as glass epoxy resin. The material of the insulating member 8 is not limited to insulating resin and may be a semiconductor material (e.g., silicon (Si)) that has undergone insulation treatment or ceramic. Examples of the insulation treatment include doping with insulating impurities and forming an insulating oxide film.

As shown in FIG. 17, the insulating member 8 includes a plurality of insulating layers 81. As shown in FIG. 17, the insulating layers 81 include one interposed between the first interconnect layer 71 and the second interconnect layer 72 in the axial direction s, one interposed between the second interconnect layer 72 and the third interconnect layer 73 in the axial direction s, and one interposed between the third interconnect layer 73 and the fourth interconnect layer 74 in the axial direction s. The insulating layers 81 also include one formed above the first interconnect layer 71 (on the first side in the axial direction s) and one formed below the fourth interconnect layer 74 (on the second side in the axial direction s).

The pair of terminals 9A, which are electrically connected to the primary winding 1, are the input terminals for the input current to the primary winding 1. Each of the terminals 9A includes a portion formed outside the insulating member 8 and a terminal interconnect portion 90A connected to this portion and the primary winding 1. As indicated by imaginary lines in FIG. 14, for example, the terminal interconnect portion 90A of one of the terminals 9A is connected to a first top-conductor portion 111 (a first turn 11 of the primary winding 1). As indicated by imaginary lines in FIG. 14, for example, the terminal interconnect portion 90A of the other terminal 9A is connected to a second bottom-conductor portion 122 (a second turn 12 of the primary winding 1). When a voltage is applied across the pair of terminals 9A, input current flows from one of the terminals 9A to the other terminal 9A through the primary winding 1. Thus, a magnetic field is generated from the primary winding 1.

The pair of terminals 9B, which are electrically connected to the secondary winding 2, are the output terminals for the induced current of the secondary winding 2. Each of the terminals 9B includes a portion formed outside the insulating member 8 and a terminal interconnect portion 90B connected to this portion and the secondary winding 2. As indicated by imaginary lines in FIG. 14, for example, the terminal interconnect portion 90B of one of the terminals 9B is connected to a first bottom-conductor portion 212 (a first turn 21 of the secondary winding 2). As indicated by imaginary lines in FIG. 14, for example, the terminal interconnect portion 90B of the other terminal 9B is connected to a second top-conductor portion 221 (a second turn 22 of the secondary winding 2). The magnetic field generated by the primary winding 1 generates induced current in the secondary winding 2, creating a potential difference between the pair of terminals 9B.

In the example shown in FIGS. 15 and 16, all of the pair of terminals 9A and the pair of terminals 9B are formed so to be exposed from the upper surface (facing the first side in the axial direction s) of the insulating member 8, but the present disclosure is not limited to this. Whether the pair of terminals 9A and the pair of terminals 9B are exposed from the upper surface of the insulating member 8 or from the lower surface of the insulating member 8 (the surface facing the second side in the axial direction s) may be determined according to the specifications of the coil built-in substrate B1. Accordingly, the terminal interconnect portion 90A of each terminal 9A and the terminal interconnect portion 90B of each terminal 9B may be varied as appropriate from the example shown in FIG. 14.

The advantages of the coil component A1 and the coil built-in substrate B1 according to the first embodiment are as follows.

The coil component A1 includes the primary winding 1 in which input current from the outside flows. The primary winding 1 includes a plurality of first turns 11 that are each ring-shaped as viewed in the first direction (circumferential direction t). With such an arrangement, in each first turn 11, the input current flows in opposite directions through two portions facing each other in the axial direction s. Thus, on the outside of each first turn 11, the magnetic flux generated by these portions points in opposite directions, canceling each other out. The first turns 11 are part of the first tubular portion 5A, which defines the outer periphery of the coil component A1. Accordingly, the magnetic flux outside each first turn 11 (first tubular portion 5A) is reduced, so that the coil component A1 can reduce the leakage of magnetic flux to the outside.

In the coil component A1, the primary winding 1 includes the plurality of first turns 11 and the plurality of second turns 12. The direction in which the input current flows in each of the plurality of first turns 11 and the direction in which the input current flows in each of the plurality of second turns 12 are the same, as viewed in the first direction (circumferential direction t). With such a configuration, inside the second turns 12, i.e., inside the second tubular portion 5B, the magnetic flux generated by the input current flowing in each first turn 11 and the magnetic flux generated by the input current flowing in each second turn 12 point in the same direction, strengthening each other. Accordingly, the magnetic flux inside the second tubular portion 5B is increased, so that the coil component Alcan increase the inductance.

The coil component A1 has an air-core structure without a magnetic core for the primary winding 1 and the secondary winding 2. In a coil component with a magnetic core, the magnetic core causes energy loss when the input current to the primary winding 1 is in the high frequency band. Since the coil component A1 does not include a magnetic core, energy loss caused by a magnetic core is avoided even when the input current to the primary winding 1 is in the high frequency band.

In the coil component A1, the plurality of first turns 11 of the primary winding and the plurality of first turns 21 of the secondary winding 2 are alternately arranged in the circumferential direction t. Inside each first turn 11 of the primary winding 1 is disposed a second turn 22 of the secondary winding 2, and inside each first turn 21 of the secondary winding 2 is disposed a second turn 12 of the primary winding 1. With such a configuration, the primary winding 1 and the secondary winding 2 are reliably coupled. Thus, leakage of magnetic flux due to poor coupling between the primary winding 1 and the secondary winding 2 can be prevented.

The coil built-in substrate B1 includes the plurality of interconnect layers 7. The plurality of interconnect layers 7 include the first interconnect layer 71, the second interconnect layer 72, the third interconnect layer 73 and the fourth interconnect layer 74 that are laminated in the axial direction s. The first interconnect layer 71, the second interconnect layer 72, the third interconnect layer 73 and the fourth interconnect layer 74 each have an interconnect pattern, and these interconnect patterns constitute the coil component A1. According to such a configuration, the coil component A1 is made by the manufacturing process of a printed circuit board (or a semiconductor substrate or a ceramic substrate). Thus, the coil built-in substrate B1 facilitates the manufacture of the coil component A1 having a complicated wiring structure. Moreover, since the coil component A1 is constituted by the interconnect patterns of the interconnect layers 7, the coil built-in substrate B1 can reduce the height of the coil component A1.

The first embodiment describes the example in which each of the first turns 11 of the primary winding 1 partially overlaps with one of the second turns 22 of the secondary winding 2 both as viewed in the axial direction s and as viewed in the radial direction u, but the present disclosure is not limited to this. For example, each of the first turns 11 of the primary winding 1 may partially overlap with one of the second turns 12 of the primary winding 1, rather than one of the second turns 22 of the secondary winding 2, both as viewed in the axial direction s and as viewed in the radial direction u. In such a variation, each of the first turns 21 of the secondary winding 2 partially overlaps with one of the second turns 22 of the secondary winding 2 both as viewed in the axial direction s and as viewed in the radial direction u. However, the coil component A1 is preferable to the coil component of this variation in terms of increasing the coupling coefficient between the primary winding 1 and the secondary winding 2.

The first embodiment describes the example in which the first turns 11 connected continuously along the circumferential direction t and the second turns 12 connected continuously along the circumferential direction t are connected to each other by the connecting portion 13, but the present disclosure is not limited to this. For example, each first turn 11 may be connected to a second turn 12 adjacent in the circumferential direction t. That is, the primary winding 1 may be configured such that the input current flows alternately through the first turns 11 and the second turns 12. The secondary winding 2 may also be configured such that the input current flows alternately through the first turns 21 and the second turns 22.

The first embodiment describes the example in which, in each first turn 11 (primary winding 1), the first top-conductor portion 111 is inclined in the first sense of the circumferential direction t with respect to the radial direction u, and the first bottom-conductor portion 112 is inclined in the second sense of the circumferential direction t with respect to the radial direction u, but the present disclosure is not limited to this. In each first turn 11, the first top-conductor portion 111 may not be inclined in the first sense of the circumferential direction t. In this case, to make the first connecting-conductor portions 113 and 114 extend along the axial direction s, the angle of inclination of the first bottom-conductor portion 112 in the circumferential direction t with respect to the radial direction u is increased. Conversely, the first bottom-conductor portion 112 may not be inclined in the second sense of the circumferential direction t. In this case, to make the first connecting-conductor portions 113 and 114 extend along the axial direction s, the angle of inclination of the first top-conductor portion 111 in the circumferential direction t with respect to the radial direction u is increased. Neither of the first top-conductor portion 111 and the first bottom-conductor portion 112 may be inclined in the circumferential direction t. In this case, the first connecting-conductor portions 113 and 114 are inclined with respect to the axial direction s. These variations are also applicable to the second top-conductor portion 121 and the second bottom-conductor portion 122 of each second turn 12 (primary winding 1), the first top-conductor portion 211 and the first bottom-conductor portion 212 of each first turn 21 (secondary winding 2), and the second top-conductor portion 221 and the second bottom-conductor portion 222 of each second turn 22 (secondary winding 2).

The first embodiment describes the example in which, in each first turn 11 (primary winding 1), the dimension of the first connecting-conductor portion 114 along the circumferential direction t is larger than the dimension of the first connecting-conductor portion 113 along the circumferential direction t, as viewed in the axial direction s, but the present disclosure is not limited to this. For example, the above-noted dimensions may be approximately the same. In this case, each of the interval between two adjacent first top-conductor portions 111 in the circumferential direction t and the interval between two adjacent first bottom-conductor portions 112 in the circumferential direction t is relatively large at a portion closer to the outer circumferential edge 52A and relatively small at a portion closer to the inner circumferential edge 51A. Such a variation is also applicable to the pair of second connecting-conductor portions 123 and 124 of each second turn 12 (primary winding 1), the pair of first connecting-conductor portions 213 and 214 of each first turn 21 (secondary winding 2), and the pair of second connecting-conductor portions 223 and 224 of each second turn 22 (secondary winding 2).

A coil component A2 according to a second embodiment is described below with reference to FIGS. 18 to 24. The coil component A2 is an inductor, for example, and includes a winding 3. The coil component A2 may include a magnetic core, but preferably has an air-core structure without a magnetic core. As with the coil component A1, the coil component A1 may be toroidal in appearance. As with the coil component A1, the overall shape of the coil component A2 is defined by various combinations of the above-noted planar shapes and cross-sectional shapes. The second embodiment describes the example in which the planar shape is annular and the cross-sectional shape is the shape of a rectangular ring. For convenience of description, in a plan view of the coil component A2, the direction in which the central axis extends is referred to as the axial direction s, the direction around the central axis as the circumferential direction t, and the direction extending radially from the central axis as the radial direction u. The axial direction s corresponds to the thickness direction of the coil component A2. The circumferential direction t corresponds to the toroidal direction of the coil component A2. The above-noted sectional shape refers to the shape in cross section in the plane defined by the axial direction s and the radial direction u.

Figure 18:
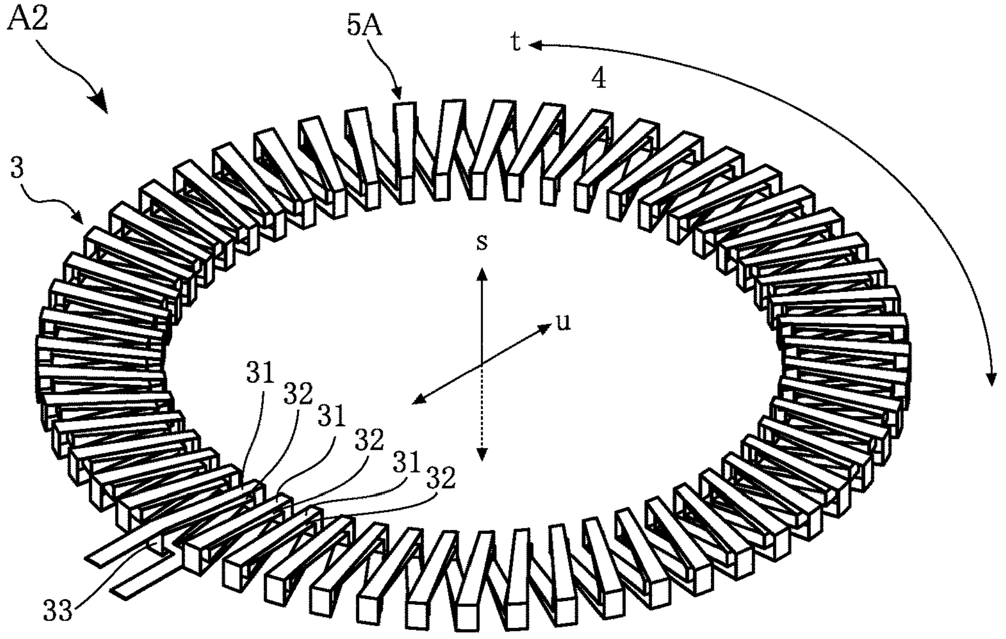
FIG. 18 is a perspective view showing a coil component according to a second embodiment.
Figure 19:
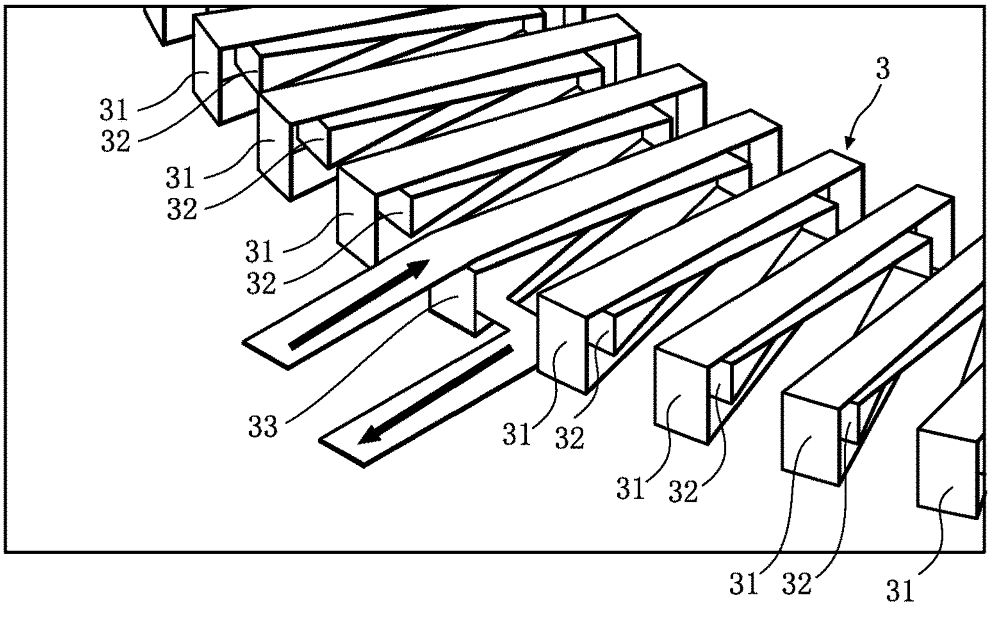
FIG. 19 is an enlarged view showing a part of FIG. 18.
Figure 20:
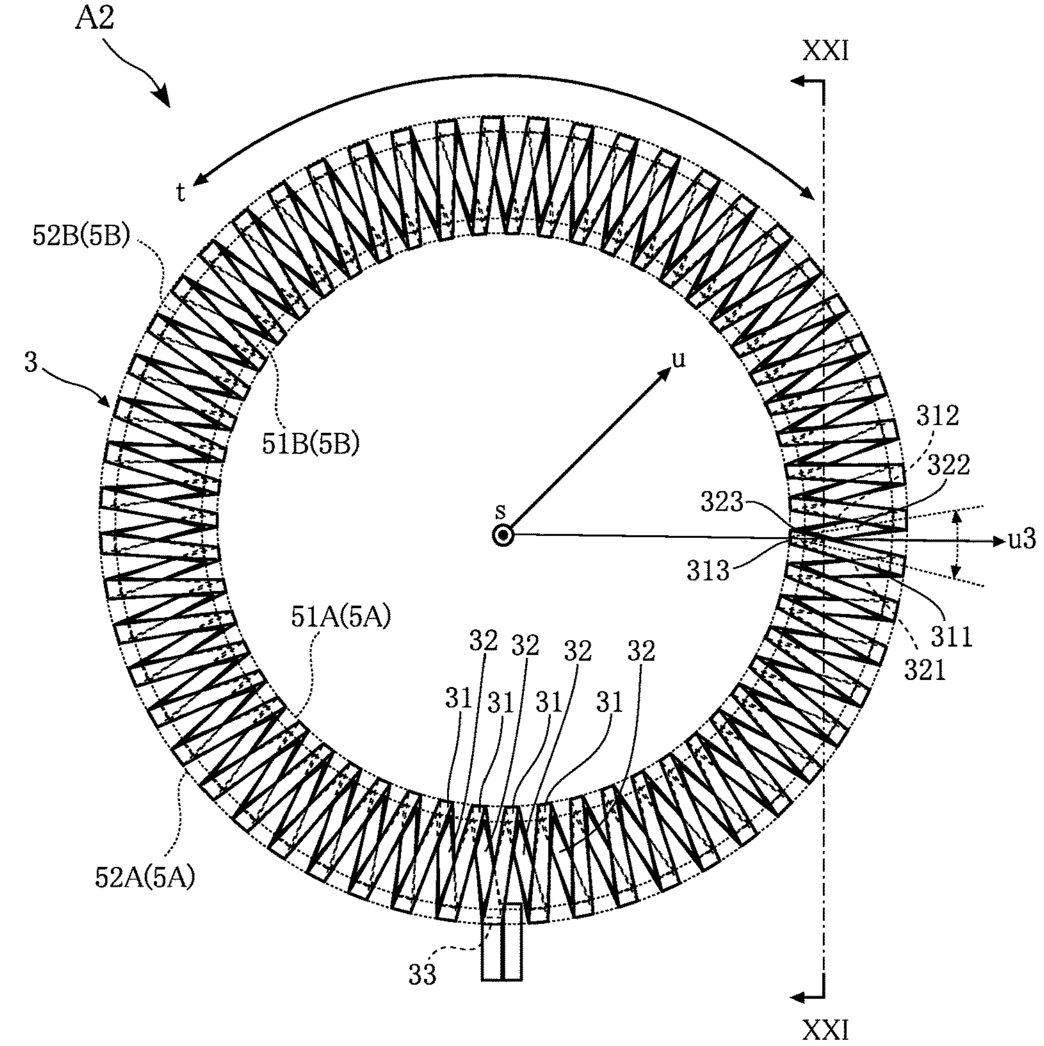
FIG. 20 is a plan view showing the coil component according to the second embodiment.
Figure 21:
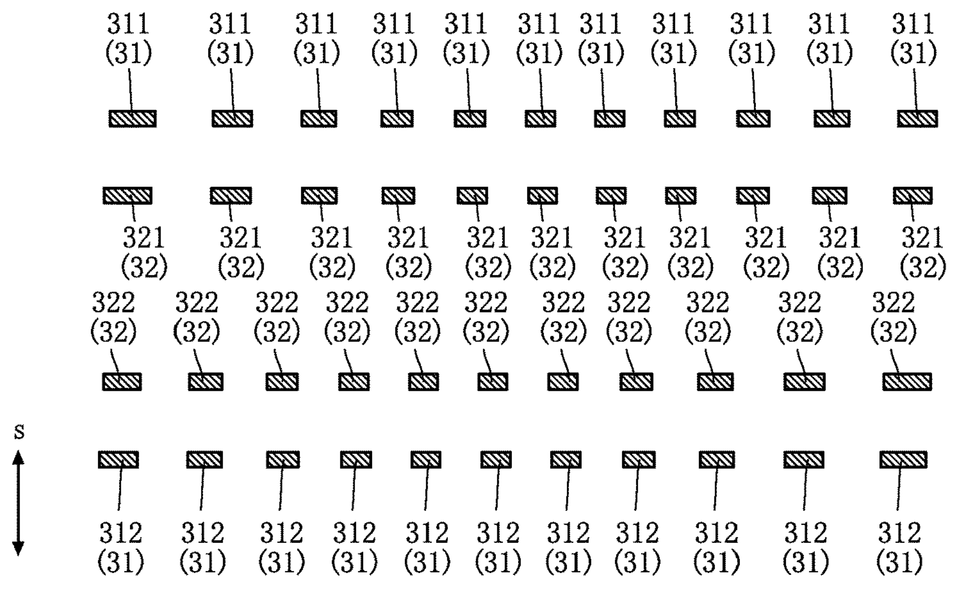
FIG. 21 is a cut end view along line XXI-XXI in FIG. 20.
Figure 22:
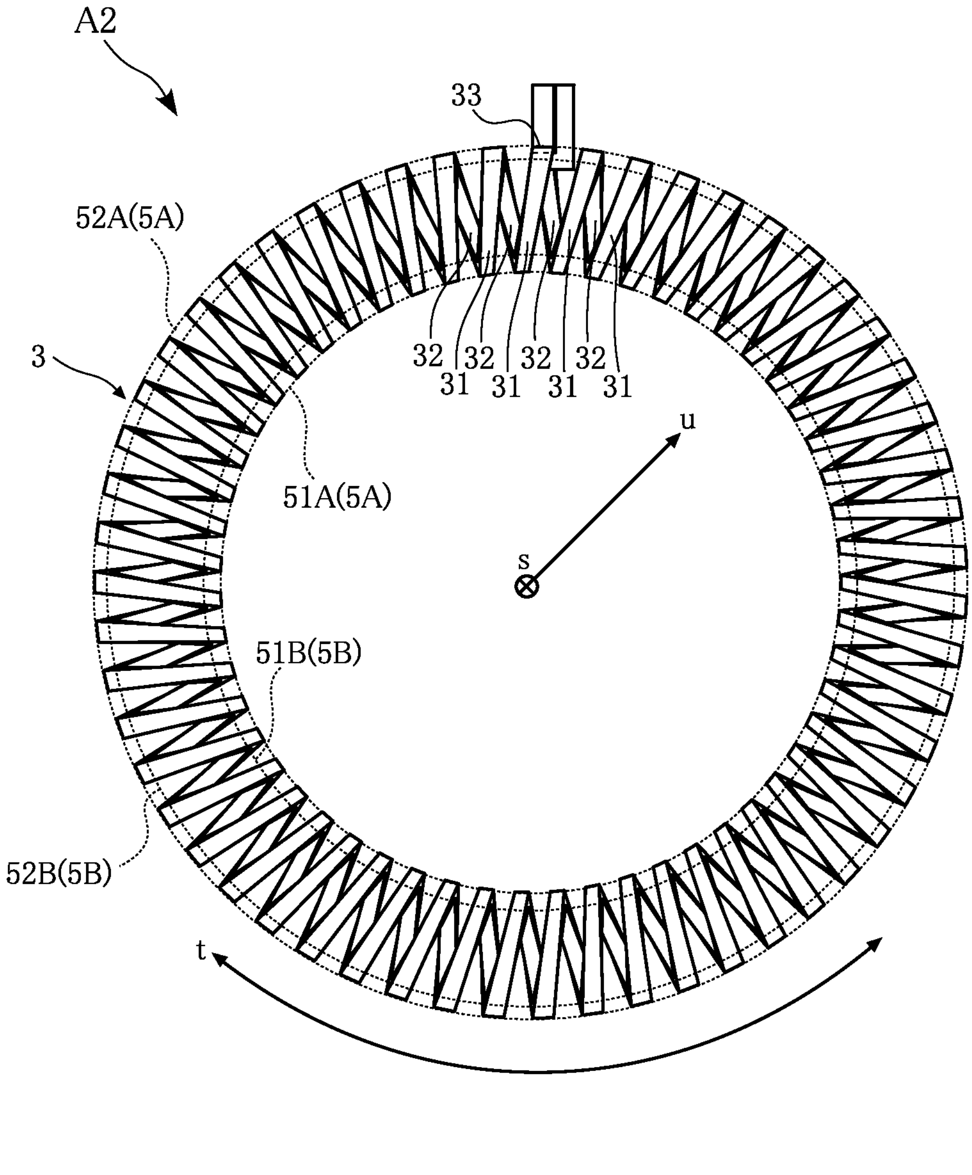
FIG. 22 is a bottom view showing the coil component according to the second embodiment.
Figure 23:
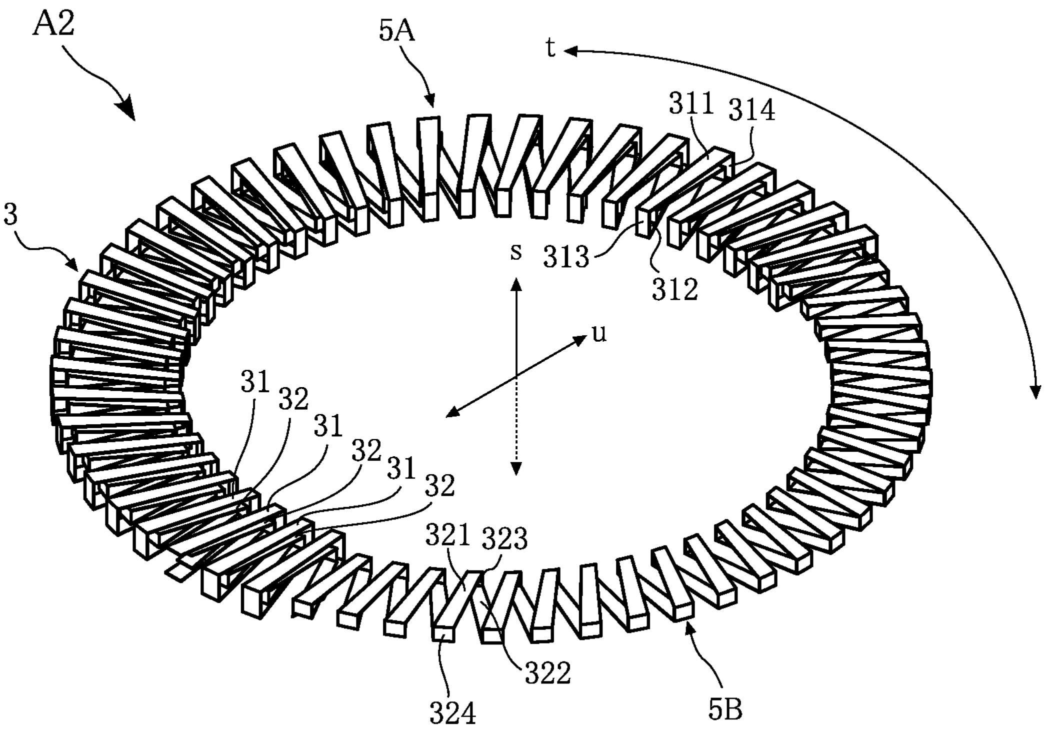
FIG. 23 is a view provided by omitting a part (a part of a first tubular portion) from the perspective view shown in FIG. 18.
Figure 24:
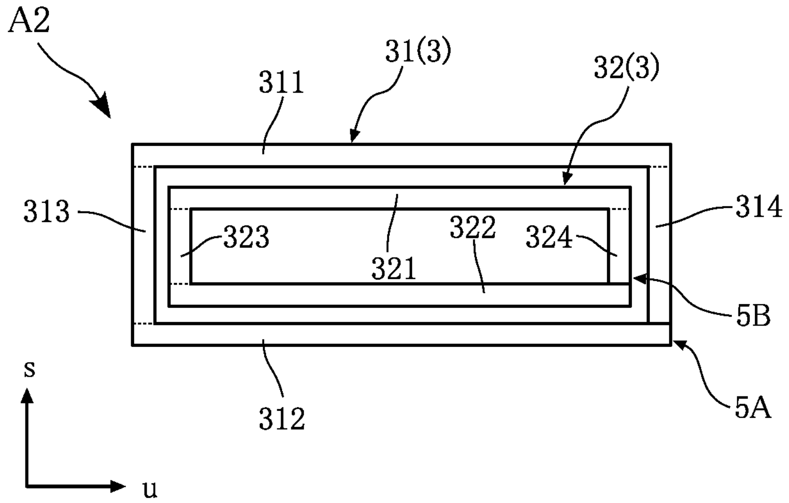
FIG. 24 is a schematic view of a winding of the coil component according to the second embodiment, as viewed along the circumferential direction.

FIG. 18 is a perspective view showing the coil component A2. FIG. 19 is an enlarged view showing a part of FIG. 18. FIG. 20 is a plan view showing the coil component A2. FIG. 21 is a cut end view along line XXI-XXI in FIG. 20. FIG. 22 is a bottom view showing the coil component A2. FIG. 23 is a view provided by omitting a part (a part of the first tubular portion 5A described later) from the perspective view shown in FIG. 18. In FIG. 23, the connecting portion 33 (described later) is omitted. FIG. 24 is a schematic view of the winding 3 as viewed along the circumferential direction t.

In the coil component A2, the winding 3 is doubly wound. By doubly winding the winding 3, the coil component A2 includes a first tubular portion 5A and a second tubular portion 5B. As with the first embodiment, each of the first tubular portion 5A and the second tubular portion 5B has a toroidal shape. As shown in FIG. 23, the second tubular portion 5B is located inside the first tubular portion 5A. The first tubular portion 5A defines the outer periphery of the coil component A1. The first tubular portion 5A and the second tubular portion 5B each are annular in plan view and have a common central axis. That is, the central axis of the first tubular portion 5A in plan view and the central axis of the second tubular portion 5B in plan view generally correspond to each other. The direction in which the central axis extends is the axial direction s. The cross-sectional shape of each of the first tubular portion 5A and the second tubular portion 5B is a rectangular ring, for example.

The winding 3 generates a magnetic field by the input current from the outside. The winding 3 is configured in the same way as the first winding 1 of the first embodiment. As shown in FIGS. 18 to 24, the winding 3 includes a plurality of first turns 31, a plurality of second turn 32, and a connecting portion 33.

As shown in FIG. 24, each of the first turns 31 has the shape of a rectangular ring, for example, as viewed along the circumferential direction t. As shown in FIGS. 18 to 20, 22 and 23, as viewed in the axial direction s, the first turns 32 are arranged side by side along the circumferential direction t. As shown in FIG. 24, each of the first turns 31 has a first top-conductor portion 311, a first bottom-conductor portion 312, and a pair of first connecting-conductor portions 313 and 314.

In each of the first turns 31, the first top-conductor portion 311 and the first bottom-conductor portion 312 are spaced apart from each other in the axial direction s, as shown in FIG. 24. As shown in FIGS. 20 and 22, as viewed in the axial direction s, each of the first top-conductor portions 311 and each of the first bottom-conductor portion 312 extend from the inner circumferential edge 51A of the first tubular portion 5A toward the outer circumferential edge 52A of the first tubular portion 5A. Each of the first top-conductor portions 311 and each of the first bottom-conductor portions 312 are in the form of a strip, as viewed in the axial direction s. As shown in FIG. 24, each of the pair of first connecting-conductor portions 313 and 314 extends from the first top-conductor portion 311 along the axial direction s. The first connecting-conductor portion 313 leads to the first bottom-conductor portion 312 of the same first turn 31. The first connecting-conductor portion 314 leads to the first bottom-conductor portion 312 of the first turn 31 adjacent in the circumferential direction t. Each of the pair of first connecting-conductor portions 313 and 314 is generally orthogonal to the first top-conductor portion 311 and the first bottom-conductor portion 312. The first connecting-conductor portion 313 overlaps with the inner circumferential edge 51A of the first tubular portion 5A as viewed in the axial direction s. The first connecting-conductor portion 314 overlaps with the outer circumferential edge 52A of the first tubular portion 5A as viewed in the axial direction s. Each of the pair of first connecting-conductor portions 313 and 314 is in the form of a strip elongated in the axial direction s, as viewed along the radial direction u.

In the present embodiment, each first top-conductor portion 311 is inclined in a first sense of the circumferential direction t with respect to the radial direction u, and each first bottom-conductor portion 312 is inclined in a second sense of the circumferential direction t with respect to the radial direction u. In the example shown in FIG. 20, assuming that the radial direction u pointing to each first connecting-conductor portion 313 is the radial direction u3, the first top-conductor portion 311 leading to the first connecting-conductor portion 313 is inclined clockwise in the circumferential direction t with respect to the radial direction u3. Each first bottom-conductor portion 312 leading to the relevant first connecting-conductor portion 313 is inclined counterclockwise in the circumferential direction t with respect to the radial direction u3. In this way, the first top-conductor portion 311 and the first bottom-conductor portion 312 are inclined in opposite senses of the circumferential direction t with respect to the radial direction u, which allows the first connecting-conductor portions 313 and 314 to be formed along the axial direction s.

In the present embodiment, two adjacent ones of the first top-conductor portions 311 in the circumferential direction t are disposed with a predetermined interval between them, so are two adjacent ones of the first bottom-conductor portions 312 in the circumferential direction t. The interval is approximately the same on the inner circumferential edge 51A side and on the outer circumferential edge 52A side. With such an arrangement, as viewed in the axial direction s, the dimension of each first connecting-conductor portion 314 along the circumferential direction t is larger than the dimension of each first connecting-conductor portion 313 along the circumferential direction t.

Two adjacent ones of the plurality of first turns 31 in the circumferential direction t are directly connected to each other, so that the input current flowing in the winding 1 flows through the plurality of first turns 31 in sequence. At this time, the input current is transmitted to the first connecting-conductor portion 314 of each first turn 31 from the first bottom-conductor portion 312 of the adjacent first turn 31 located on the first side in the circumferential direction t. The input current then flows from the first connecting-conductor portion 314 to the first bottom-conductor portion 312 through the first top-conductor portion 311 and the first connecting-conductor portion 313. That is, in the example shown in FIG. 24, the input current flows counterclockwise through each first turn 31. The input current is then transmitted to the adjacent first turn 11 located on the second side in the circumferential direction t. In this way, the input current of the winding 3 circulates through each of the first turns 31. Note that the direction of the input current in the first turns 31 may be opposite to the above-described example. That is, the input current may be transmitted to the first bottom-conductor portion 312 of each first turn 31 from the first connecting-conductor portion 314 of the adjacent first turn 31 located on the second side in the circumferential direction t. The input current may then flow from the first bottom-conductor portion 312 to the first connecting-conductor portion 314 through the first connecting-conductor portion 313 and the first top-conductor portion 311. That is, in the example shown in FIG. 24, the input current may flow clockwise through each first turn 31.

As shown in FIG. 24, each of the second turns 32 has the shape of a rectangular ring, for example, as viewed along the circumferential direction t. As shown in FIG. 24, as viewed along the circumferential direction t, each second turn 32 is located inside each first turn 31. As shown in FIGS. 20 and 22, as viewed in the axial direction s, the second turns 32 are arranged side by side along the circumferential direction t. As shown in FIGS. 20 and 22, as viewed in the axial direction s, the first turns 31 and the second turns 32 are alternately arranged in the circumferential direction t. As shown in FIG. 24, each of the second turns 32 has a second top-conductor portion 321, a second bottom-conductor portion 322, and a pair of second connecting-conductor portions 323 and 324.

In each of the second turns 32, the second top-conductor portion 321 and the second bottom-conductor portion 322 are spaced apart from each other in the axial direction s, as shown in FIG. 24. As shown in FIGS. 20 and 22, as viewed in the axial direction s, each of the second top-conductor portions 321 and each of the second bottom-conductor portions 322 extend from the inner circumferential edge 51B of the second tubular portion 5B toward the outer circumferential edge 52B of the second tubular portion Each of the second top-conductor portions 321 and each of the second bottom-conductor portions 322 are in the form of a strip, as viewed in the axial direction s. As shown in FIG. 24, each of the pair of second connecting-conductor portions 323 and 324 extends from the second top-conductor portion 321 along the axial direction s. The second connecting-conductor portion 323 leads to the second bottom-conductor portion 322 of the same second turn 32. The second connecting-conductor portion 324 leads to the second bottom-conductor portion 322 of the second turn 32 adjacent in the circumferential direction t. Each of the pair of second connecting-conductor portions 323 and 324 is generally orthogonal to the second top-conductor portion 321 and the second bottom-conductor portion 322. The second connecting-conductor portion 323 overlaps with the inner circumferential edge 51B of the second tubular portion 5B as viewed in the axial direction s. The second connecting-conductor portion 324 overlaps with the outer circumferential edge 52B of the second tubular portion 5B as viewed in the axial direction s. Each of the pair of second connecting-conductor portions 323 and 324 is in the form of a strip elongated in the axial direction s, as viewed along the radial direction u.

In the present embodiment, each second top-conductor portion 321 is inclined in the first sense of the circumferential direction t with respect to the radial direction u, and each second bottom-conductor portion 322 is inclined in the second sense of the circumferential direction t with respect to the radial direction u. In the example shown in FIG. 20, assuming that the radial direction u pointing to each second connecting-conductor portion 323 is the radial direction u3, the second top-conductor portion 321 leading to the second connecting-conductor portion 323 is inclined clockwise in the circumferential direction t with respect to the radial direction u3. Each second bottom-conductor portion 322 leading to the relevant second connecting-conductor portion 323 is inclined counterclockwise in the circumferential direction t with respect to the radial direction u3. In this way, the second top-conductor portion 321 and the second bottom-conductor portion 322 are inclined in opposite senses of the circumferential direction t with respect to the radial direction u, which allows the second connecting-conductor portions 323 and 324 to be formed along the axial direction s.

In the present embodiment, two adjacent ones of the second top-conductor portions 321 in the circumferential direction t are disposed with a predetermined interval between them, so are two adjacent ones of the second bottom-conductor portions 322 in the circumferential direction t. The interval is approximately the same on the inner circumferential edge 51B side and on the outer circumferential edge 52B side. With such an arrangement, as viewed in the axial direction s, the dimension of each second connecting-conductor portion 324 along the circumferential direction t is larger than the dimension of each second connecting-conductor portion 323 along the circumferential direction t.

Two adjacent ones of the plurality of second turns 32 in the circumferential direction t are directly connected to each other, so that the input current flowing in the winding 3 flows through the plurality of second turns 32 in sequence. At this time, the input current is transmitted to the second connecting-conductor portion 324 of each second turn 32 from the second bottom-conductor portion 322 of the adjacent second turn 32 located on the first side in the circumferential direction t. The input current then flows from the second connecting-conductor portion 324 to the second bottom-conductor portion 322 through the second top-conductor portion 321 and the second connecting-conductor portion 323. That is, in the example shown in FIG. 24, the input current flows counterclockwise through each second turn 32. Thus, the direction of the input current in the first turns 31 and the direction of the input current in the second turns 32 are the same, as viewed along the circumferential direction t. In this way, the input current of the winding 3 circulates through each of the second turns 32. Note that the direction of the input current in the second turns 32 may be opposite to the above-described example. That is, the input current may be transmitted to the second bottom-conductor portion 322 of each second turn 32 from the second connecting-conductor portion 324 of the adjacent second turn 32 located on the second side in the circumferential direction t. The input current may then flow from the second bottom-conductor portion 322 to the second connecting-conductor portion 324 through the second connecting-conductor portion 323 and the second top-conductor portion 321. That is, in the example shown in FIG. 24, the input current may flow clockwise through each second turn 32. Note however that the direction of the input current through each first turn 31 and the direction of the input current through each second turn 32 should be the same, as viewed along the circumferential direction t.

As shown in FIG. 19, the connecting portion 33 connects one of the first turns 11 and one of the second turns 32 to each other. For example, the connecting portion 33 is connected to the first bottom-conductor portion 312 of one of the first turns 31 and the second top-conductor portion 321 of one of the second turns 32 to electrically connect these.

The winding 3 includes the first turns 31 connected continuously along the circumferential direction t, and the second turns 32 connected continuously along the circumferential direction t. The first turns and the second turns are connected by the connecting portion 33. With such an arrangement, the input current of the winding 3 first circulates through the first turns 31, and then inputted through the connecting portion 33 to the second turns 32 to circulate through the second turns 32.

In the coil component A2, the plurality of first turns 31 are arranged in the circumferential direction t, forming the first tubular portion 5A. Also, the plurality of second turns 32 are arranged in the circumferential direction t, forming the second tubular portion 5B. The second tubular portion 5B is located inside the first tubular portion 5A.

In the coil component A2, each of the first turns 31 overlaps with one of the second turns 32 as viewed in the axial direction s and as viewed in the radial direction u, as shown in FIGS. 18 to 24. That is, as viewed in the axial direction s, each of the first top-conductor portions 311 overlaps with one of the second top-conductor portions 321, and each of the first bottom-conductor portion 312 overlaps with one of the second bottom-conductor portions 322. As viewed in the radial direction u, each of the first connecting-conductor portions 313 overlaps with one of the second connecting-conductor portions 323, and each of the first connecting-conductor portions 314 overlaps with one of the second connecting-conductor portions 324.

Figure 25:
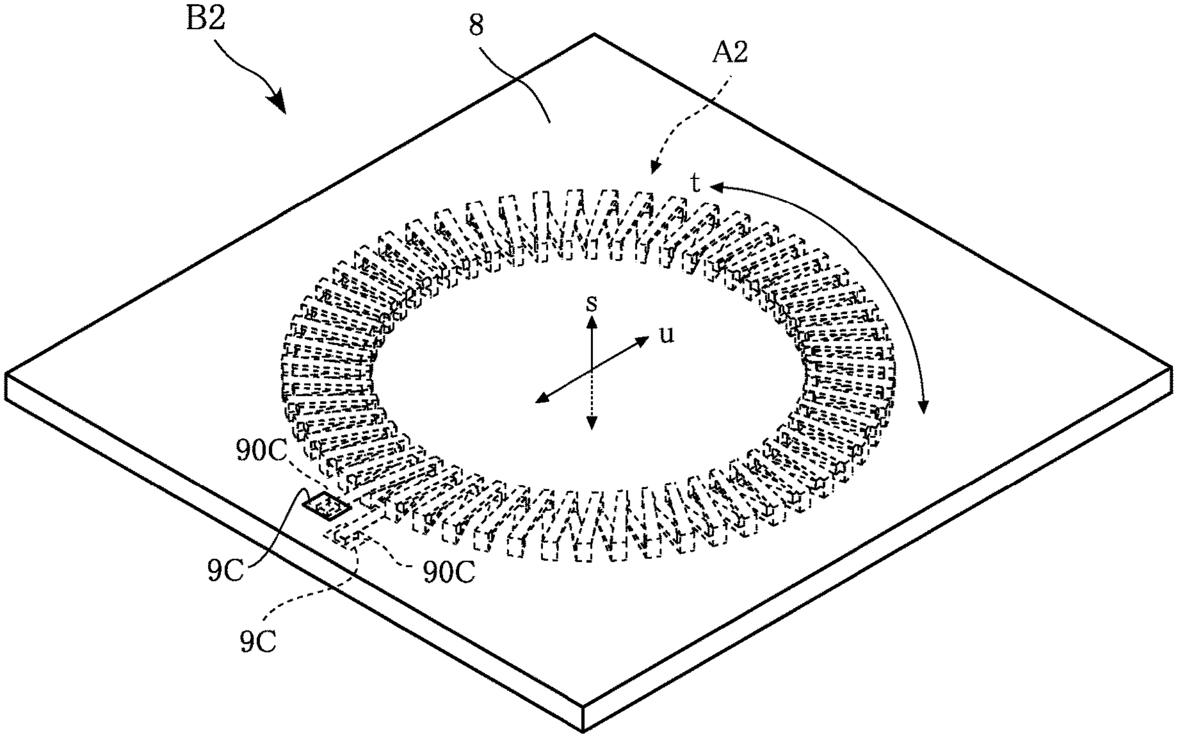
FIG. 25 is a perspective view showing a coil built-in substrate according to the second embodiment.
Figure 26:
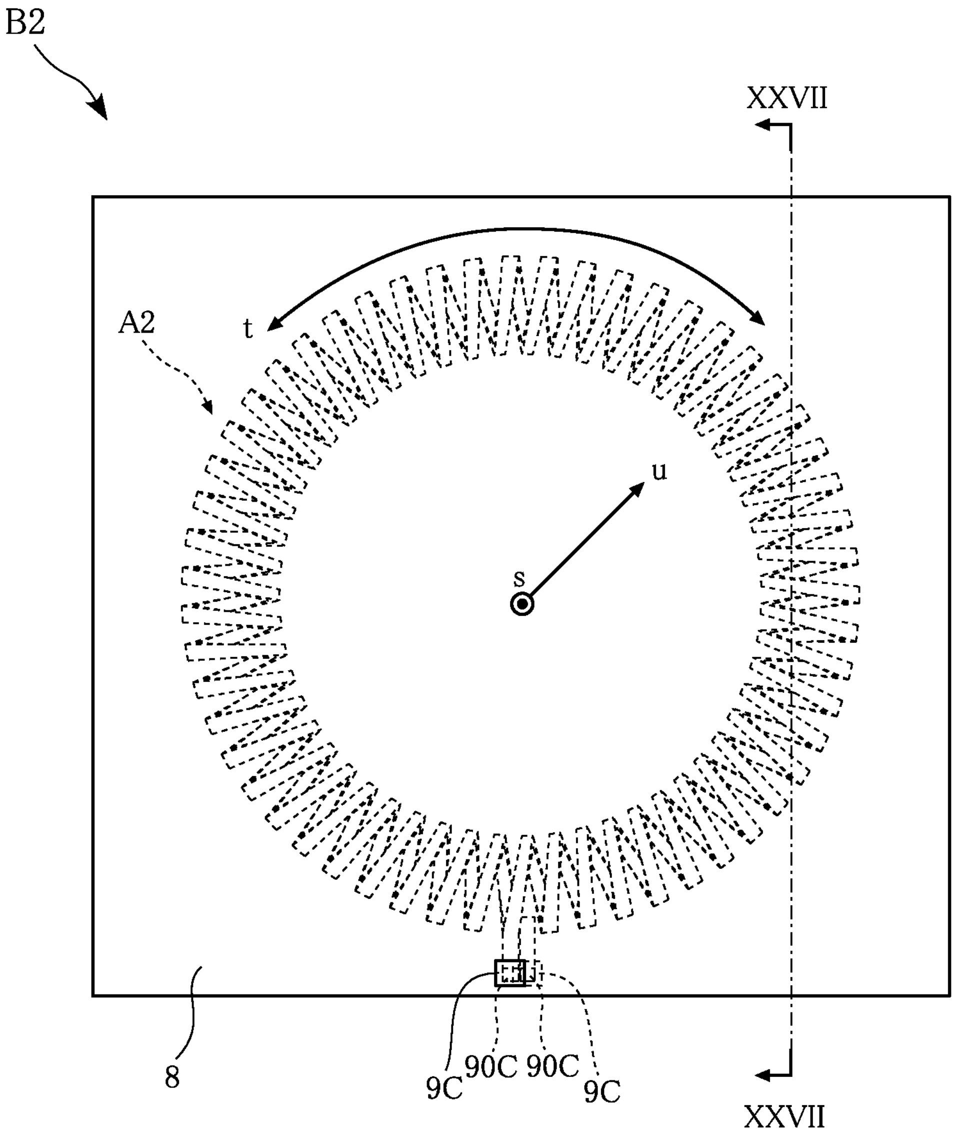
FIG. 26 is a plan view showing the coil built-in substrate according to the second embodiment.
Figure 27:
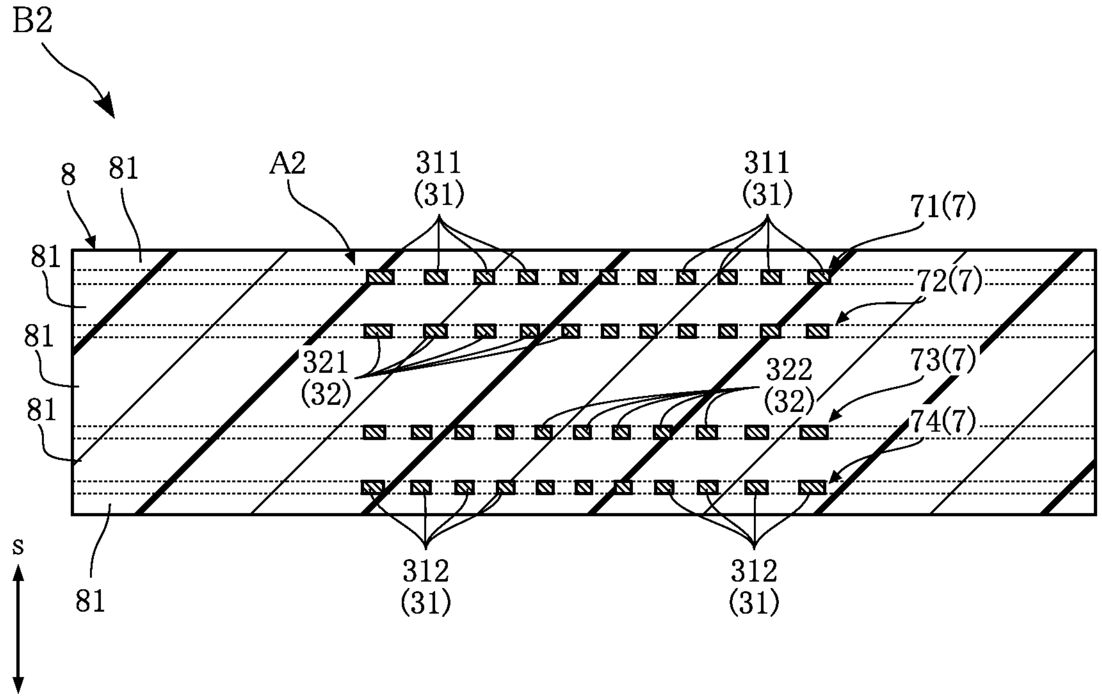
FIG. 27 is a sectional view taken along line XVIII-XVIII in FIG. 26.

A coil built-in substrate B2 incorporating the coil component A2 is described below with reference to FIGS. 25 to 27. FIG. 25 is a perspective view showing the coil built-in substrate B2. FIG. 26 is a plan view showing the coil built-in substrate B2. FIG. 27 is a sectional view taken along line XXVII-XXVII in FIG. 26.

As with the coil built-in substrate B1, the coil built-in substrate B2 is a printed circuit board. The coil built-in substrate B2 is also not limited to a printed circuit board and may be a semiconductor substrate or a ceramic substrate. The coil built-in substrate B2 incorporates the coil component A2. The coil built-in substrate B2 may be rectangular in plan view. The coil built-in substrate B2 includes a plurality of interconnect layers 7, a plurality of through electrodes 79, an insulating member 8, and a pair of terminals 9C.

As shown in FIG. 27, in the coil built-in substrate B2 again, the interconnect layers 7 include a first interconnect layer 71, a second interconnect layer 72, a third interconnect layer 73 and a fourth interconnect layer 74, each having an interconnect pattern.

As shown in FIG. 27, the interconnect pattern of the first interconnect layer 71 provides the plurality of first top-conductor portions 311. The interconnect pattern of the second interconnect layer 72 provides the plurality of second top-conductor portions 321. The interconnect pattern of the third interconnect layer 73 provides the plurality of second bottom-conductor portions 322. The interconnect pattern of the fourth interconnect layer 74 provides the plurality of first bottom-conductor portions 312.

As shown in FIG. 27, in the present embodiment again, the distance separating the first interconnect layer 71 and the second interconnect layer 72 in the axial direction s is approximately the same as the distance separating the third interconnect layer 73 and the fourth interconnect layer 74. The distance separating the second interconnect layer 72 and the third interconnect layer 73 in the axial direction s is larger than each of the distance separating the first interconnect layer 71 and the second interconnect layer 72 in the axial direction s and the distance separating the third interconnect layer 73 and the fourth interconnect layer 74 in the axial direction s. With such an arrangement, in the winding 3 of the coil component A2, the distance separating the first top-conductor portions 311 and the second top-conductor portions 321 in the axial direction s is approximately the same as the distance separating the second bottom-conductor portions 322 and the first bottom-conductor portions 312 in the axial direction s. The distance separating the second top-conductor portions 321 and the second bottom-conductor portions 322 in the axial direction s is larger than each of the distance separating the first top-conductor portions 311 and the second top-conductor portions 321 in the axial direction s and the distance separating the second bottom-conductor portions 322 and the first bottom-conductor portions 312 in the axial direction s.

The through electrodes 79 electrically connecting the first interconnect layer 71 and the fourth interconnect layer 74 provide the pair of first connecting-conductor portions 313 and 314 (the first turns 31). The through electrodes 79 electrically connecting the second interconnect layer 72 and the third interconnect layer 73 provide the pair of second connecting-conductor portions 323 and 323 (the second turns 32).

In the coil built-in substrate B2, the interconnect patterns of the interconnect layers 7 (the first interconnect layer 71, the second interconnect layer 72, the third interconnect layer 73 and the fourth interconnect layer 74) and the through electrodes 79 constitute the coil component A2.

The pair of terminals 9C, which are electrically connected to the winding 3, are the input terminals for the input current to the winding 3. Each of the terminals 9C includes a portion formed outside the insulating member 8 and a terminal interconnect portion 90C connected to this portion and the winding 3. As shown in FIG. 25, the terminal interconnect portion 90C of one of the terminals 9C is connected, for example, to a first top-conductor portion 311 (a first turn 31). The terminal interconnect portion 90C of the other terminal 9C is connected, for example, to a second bottom-conductor portion 322 (a second turn 12). When a voltage is applied across the pair of terminals 9C, input current flows from one of the terminals 9C to the other terminal 9C through the winding 3. Thus, a magnetic field is generated from the winding 3.

In the example shown in FIG. 25, each of the terminals 9C is formed so as to be exposed from the upper surface (facing the first side in the axial direction s) of the insulating member 8, but the present disclosure is not limited to this. Whether the pair of terminals 9C are exposed from the upper surface of the insulating member 8 or from the lower surface of the insulating member 8 (the surface facing the second side in the axial direction s) may be determined according to the specifications of the coil built-in substrate B2.

The advantages of the coil component A2 and the coil built-in substrate B2 according to the second embodiment are as follows.

The coil component A2 includes the winding 3 in which input current from the outside flows. The winding 3 includes a plurality of first turns 31 that are each ring-shaped as viewed in the first direction (circumferential direction t). With such an arrangement, in each first turn 31, the input current flows in opposite directions through two portions facing each other in the axial direction s. Thus, on the outside of each first turn 31, the magnetic flux generated by these portions points in opposite directions, canceling each other out. The first turns 31 are part of the first tubular portion 5A, which defines the outer periphery of the coil component A2. Accordingly, the magnetic flux outside each first turn 31 (first tubular portion 5A) is reduced, so that the coil component A2 can reduce the leakage of magnetic flux to the outside.

In the coil component A2, the wiring 3 includes the plurality of first turns 31 and the plurality of second turns 32. The direction in which the input current flows in each of the plurality of first turns 31 and the direction in which the input current flows in each of the plurality of second turns 32 are the same, as viewed in the first direction (circumferential direction t). With such a configuration, inside the second turns 32, i.e., inside the second tubular portion 5B, the magnetic flux generated by the input current flowing in each first turn 31 and the magnetic flux generated by the input current flowing in each second turn 32 point in the same direction, strengthening each other. Accordingly, the magnetic flux inside the second tubular portion 5B is increased, so that the coil component A2 can increase the inductance.

The coil component A1 has an air-core structure without a magnetic core for the winding 3. In a coil component with a magnetic core, the magnetic core causes energy loss when the input current to the winding 3 is in the high frequency band. Since the coil component A2 does not include a magnetic core, energy loss caused by a magnetic core is avoided even when the input current to the winding 3 is in the high frequency band.

In the coil built-in substrate B2, the first interconnect layer 71, the second interconnect layer 72, the third interconnect layer 73 and the fourth interconnect layer 74 each have an interconnect pattern, and these interconnect patterns constitute the coil component A2. According to such a configuration, the coil component A2 is made by the manufacturing process of a printed circuit board (or a semiconductor substrate or a ceramic substrate). Thus, the coil built-in substrate B2 facilitates the manufacture of the coil component A2 having a complicated wiring structure. Moreover, since the coil component A2 is constituted by the interconnect patterns of the interconnect layers 7, the coil built-in substrate B2 can reduce the height of the coil component A2.

The second embodiment describes the example in which each of the first turns 31 overlaps with one of the second turns 32 as viewed in the axial direction s, but the present disclosure is not limited to this. For example, each of the first turns 31 may only partially overlap with or may not overlap with one of the second turns 32. However, the coil component A2 is preferable to the coil component of this variation in terms of increasing the inductance.

The second embodiment describes the example in which, in each first turn 31, the first top-conductor portion 311 is inclined in the first sense of the circumferential direction t with respect to the radial direction u, and the first bottom-conductor portion 312 is inclined in the second sense of the circumferential direction t with respect to the radial direction u, but the present disclosure is not limited to this. In each first turn 31, the first top-conductor portion 311 may not be inclined in the first sense of the circumferential direction t. In this case, to make the first connecting-conductor portions 313 and 314 extend along the axial direction s, the angle of inclination of the first bottom-conductor portion 312 in the circumferential direction t with respect to the radial direction u is increased. Conversely, the first bottom-conductor portion 312 may not be inclined in the second sense of the circumferential direction t. In this case, to make the first connecting-conductor portions 313 and 314 extend along the axial direction s, the angle of inclination of the first top-conductor portion 311 in the circumferential direction t with respect to the radial direction u is increased. Neither of the first top-conductor portion 311 and the first bottom-conductor portion 312 may be inclined in the circumferential direction t. In this case, the first connecting-conductor portions 313 and 314 are inclined with respect to the axial direction s. These variations are also applicable to the second top-conductor portion 321 and the second bottom-conductor portion 322 of each second turn 32.

The second embodiment describes the example in which, in each first turn 31, the dimension of the first connecting-conductor portion 314 along the circumferential direction t is larger than the dimension of the first connecting-conductor portion 313 along the circumferential direction t, as viewed in the axial direction s, but the present disclosure is not limited to this. For example, the above-noted dimensions may be approximately the same. In this case, each of the interval between two adjacent first top-conductor portions 311 in the circumferential direction t and the interval between two adjacent first bottom-conductor portions 312 in the circumferential direction t is relatively large at a portion closer to the outer circumferential edge 52A and relatively small at a portion closer to the inner circumferential edge 51A. Such a variation is also applicable to the pair of second connecting-conductor portions 323 and 324 of each second turn 32.

The first embodiment and the second embodiment describe the example in which the through electrodes 79 in the coil built-in substrates B1 and B2 are columnar, but the present disclosure is not limited to this. For example, each of the through electrodes 79 may be a through via. The through via may be circular in plan view. Each through electrode 79 may be provided by a plurality of through vias.

The first embodiment and the second embodiment describe the example in which the coil components A1 and A2 are toroidal in appearance, but the present disclosure is not limited to this. For example, each coil component may have a solenoid shape. In the present disclosure, the solenoid shape refers to the shape that is not ring-shaped in plan view, unlike the toroidal shape, and includes not only ones in which a wire is wound around a straight line but also ones in which a wire is wound around a curved line. In such a variation, the first turns 11 and the second turns 12 of the primary winding 1 and the first turns 21 and the second turns 22 of the secondary winding 2, or the first turns 31 and the second turns 32 of the winding 3 are arranged along a straight line or a curved line. However, since the solenoid shape is not ring-shaped in plan view, the toroidal shape like the coil components A1 and A2 is more effective in reducing magnetic flux leakage.

The first embodiment and the second embodiment describe the example in which each coil component A1 and A2 is constituted by the wiring patterns of the interconnect layers 7 of the coil built-in substrate, the present disclosure is not limited to this. For example, each of the primary winding 1 and the secondary winding 2 (or the winding 3) may be formed by winding a linear or plate-like lead.

The coil component and the coil built-in substrate according to the present disclosure are not limited to the foregoing embodiments. The specific configuration of each of the coil component and the coil built-in substrate according to the present disclosure may be varied in design in many ways.

The present disclosure includes the embodiments described in the following clauses.

Clause 1.

A coil component comprising:

- a primary winding that generates a magnetic field by an input current from outside; and
- a secondary winding through which an induced current generated by the magnetic field flows,
- wherein the primary winding includes a plurality of primary first turns and a plurality of primary second turns, each of the primary first turns and each of the primary second turns being ring-shaped as viewed in a first direction,
- the secondary winding includes a plurality of secondary first turns and a plurality of secondary second turns, each of the secondary first turns and each of the secondary second turns being ring-shaped as viewed in the first direction,
- the plurality of primary first turns and the plurality of secondary first turns are alternately arranged in the first direction to form a first tubular portion,
- the plurality of primary second turns and the plurality of secondary second turns are alternately arranged in the first direction to form a second tubular portion,
- the second tubular portion is located inside the first tubular portion as viewed in the first direction, and
- a direction in which the input current flows in each of the plurality of primary first turns and a direction in which the input current flows in each of the plurality of primary second turns are the same.

Clause 2.

The coil component according to clause 1, wherein each of the plurality of primary first turns includes a primary first top-conductor portion and a primary first bottom-conductor portion spaced apart from each other in a thickness direction orthogonal to the first direction,

- each of the plurality of primary second turns includes a primary second top-conductor portion and a primary second bottom-conductor portion spaced apart from each other in the thickness direction,
- each of the plurality of secondary first turns includes a secondary first top-conductor portion and a secondary first bottom-conductor portion spaced apart from each other in the thickness direction, and
- each of the plurality of secondary second turns includes a secondary second top-conductor portion and a secondary second bottom-conductor portion spaced apart from each other in the thickness direction.

Clause 3.

The coil component according to clause 2, wherein the primary first top-conductor portion and the secondary first top-conductor portion overlap with each other as viewed in the first direction, and

- the primary first bottom-conductor portion and the secondary first bottom-conductor portion overlap with each other as viewed in the first direction.

Clause 4.

The coil component according to clause 3, wherein the primary second top-conductor portion and the secondary second top-conductor portion overlap with each other as viewed in the first direction, and

- the primary second bottom-conductor portion and the secondary second bottom-conductor portion overlap with each other as viewed in the first direction.

Clause 5.

The coil component according to clause 4, wherein, in the thickness direction, a distance separating the primary second top-conductor portion and the primary second bottom-conductor portion is larger than each of a distance separating the primary first top-conductor portion and the primary second top-conductor portion and a distance separating the primary second bottom-conductor portion and the primary first bottom-conductor portion.

Clause 6.

The coil component according to any of clauses 3 to 5, wherein the primary first top-conductor portion and the secondary second top-conductor portion overlap with each other as viewed in the thickness direction, and the primary first bottom-conductor portion and the secondary second bottom-conductor portion overlap with each other as viewed in the thickness direction.

Clause 7.

The coil component according to clause 6, wherein the primary second top-conductor portion and the secondary first top-conductor portion overlap with each other as viewed in the thickness direction, and the primary second bottom-conductor portion and the secondary first bottom-conductor portion overlap with each other as viewed in the thickness direction.

Clause 8.

The coil component according to any of clauses 3 to 7, wherein each of the plurality of primary first turns includes a pair of primary first connecting-conductor portions each extending from the primary first top-conductor portion in the thickness direction, one of the pair of primary first connecting-conductor portions leads to the primary first bottom-conductor portion, each of the plurality of primary second turns includes a pair of primary second connecting-conductor portions each extending from the primary second top-conductor portion in the thickness direction, and one of the pair of primary second connecting-conductor portions leads to the primary second bottom-conductor portion.

Clause 9.

The coil component according to clause 8, wherein another one of the pair of primary first connecting-conductor portions leads to the primary first bottom-conductor portion of an adjacent one of the primary first turns, and another one of the pair of primary second connecting-conductor portions leads to the primary second bottom-conductor portion of an adjacent one of the primary second turns.

Clause 10.

The coil component according to clause 9, wherein the primary winding further includes a primary connecting portion electrically connecting one of the plurality of primary first turns and one of the plurality of primary second turns.

Clause 11.

The coil component according to clause 9 or 10, wherein each of the plurality of secondary first turns includes a pair of secondary first connecting-conductor portions each extending from the secondary first top-conductor portion in the thickness direction, one of the pair of secondary first connecting-conductor portions leads to the secondary first bottom-conductor portion, each of the plurality of secondary second turns includes a pair of secondary second connecting-conductor portions each extending from the secondary second top-conductor portion in the thickness direction, and one of the pair of secondary second connecting-conductor portions leads to the secondary second bottom-conductor portion.

Clause 12.

The coil component according to clause 11, wherein another one of the pair of secondary first connecting-conductor portions leads to the secondary first bottom-conductor portion of an adjacent one of the secondary first turns, and another one of the pair of secondary second connecting-conductor portions leads to the secondary second bottom-conductor portion of an adjacent one of the secondary second turns.

Clause 13.

The coil component according to clause 12, wherein the secondary winding further includes a secondary connecting portion electrically connecting one of the plurality of secondary first turns and one of the plurality of secondary second turns.

Clause 14.

The coil component according to any of clauses 2 to 13, wherein each of the first tubular portion and the second tubular portion is annular as viewed in the thickness direction, with a circumferential direction thereof corresponding to the first direction.

Clause 15.

The coil component according to clause 14, wherein each of the primary first top-conductor portion, the primary first bottom-conductor portion, the secondary first top-conductor portion and the secondary first bottom-conductor portion extends from an inner circumferential edge to an outer circumferential edge of the first tubular portion, as viewed in the thickness direction.

Clause 16.

The coil component according to clause 15, wherein each of the primary first top-conductor portion, the primary first bottom-conductor portion, the secondary first top-conductor portion and the secondary first bottom-conductor portion is in a form of a strip as viewed in the thickness direction.

Clause 17.

The coil component according to clause 15 or 16, wherein each of the primary first top-conductor portion and the secondary first top-conductor portion is inclined in a first sense of the circumferential direction of the first tubular portion with respect to a radial direction of the first tubular portion, as viewed in the thickness direction, and each of the primary first bottom-conductor portion and the secondary first bottom-conductor portion is inclined in a second sense of the circumferential direction of the first tubular portion with respect to the radial direction of the first tubular portion, as viewed in the thickness direction.

Clause 18.

The coil component according to any of clauses 14 to 17, wherein each of the primary second top-conductor portion, the primary second bottom-conductor portion, the secondary second top-conductor portion and the secondary second bottom-conductor portion extends from an inner circumferential edge to an outer circumferential edge of the second tubular portion, as viewed in the thickness direction.

Clause 19.

The coil component according to clause 18, wherein each of the primary second top-conductor portion, the primary second bottom-conductor portion, the secondary second top-conductor portion and the secondary second bottom-conductor portion is in a form of a strip as viewed in the thickness direction.

Clause 20.

The coil component according to clause 18 or 19, wherein each of the primary second top-conductor portion and the secondary second top-conductor portion is inclined in a first sense of the circumferential direction of the second tubular portion with respect to a radial direction of the second tubular portion, as viewed in the thickness direction, and each of the primary second bottom-conductor portion and the secondary second bottom-conductor portion is inclined in a second sense of the circumferential direction of the second tubular portion with respect to the radial direction of the second tubular portion, as viewed in the thickness direction.

Clause 21.

A coil component comprising:

a winding that generates a magnetic field by an input current from outside, wherein the winding includes a plurality of first turns and a plurality of second turns, each of the first turns and each of the second turns being ring-shaped as viewed in a first direction, the plurality of first turns are arranged in the first direction to form a first tubular portion, the plurality of second turns are arranged in the first direction to form a second tubular portion, the second tubular portion is located inside the first tubular portion as viewed in the first direction, each of the first tubular portion and the second tubular portion is annular as viewed in a thickness direction orthogonal to the first direction, and a direction in which the input current flows in each of the plurality of primary first turns and a direction in which the input current flows in each of the plurality of primary second turns are the same.

Clause 22.

A coil built-in substrate incorporating the coil component according to any of clauses 2 to 21, comprising:

a plurality of interconnect layers laminated in the thickness direction; and a plurality of insulating layers interposed between the plurality of interconnect layers in the thickness direction, wherein the coil component is constituted by wiring patterns of the plurality of interconnect layers.

Clause 23.

The coil built-in substrate according to clause 22, wherein the coil component is a transformer.

LIST OF REFERENCE CHARACTERS

A1, A2: Coil component 1: Primary winding
11: First turn 111: First top-conductor portion
112: First bottom-conductor portion
113, 114: First connecting-conductor portion
12: Second turn 121: Second top-conductor portion
122: Second bottom-conductor portion
123, 124: Second connecting-conductor portion
13: Connecting portion 2: Secondary winding
21: First turn 211: First top-conductor portion
212: First bottom-conductor portion
213, 214: First connecting-conductor portion
22: Second turn 221: Second top-conductor portion
222: Second bottom-conductor portion
223, 224: Second connecting-conductor portion
23: Connecting portion 3: Winding
31: First turn 311: First top-conductor portion
312: First bottom-conductor portion
313, 314: First connecting-conductor portion
32: Second turn 321: Second top-conductor portion
322: Second bottom-conductor portion
323, 324: Second connecting-conductor portion
33: Connecting portion 5A: First tubular portion
Second tubular portion 51A, 51B: Inner circumferential edge
52A, 52B: Outer circumferential edge
B1, B2: Coil built-in substrate
7: Interconnect layer 71: First interconnect layer
72: Second interconnect layer 73: Third interconnect layer
74: Fourth interconnect layer 79: Through electrode
8: Insulating member 81: Insulating layer
9A, 9B, 9C: Terminal
90B, 90C: Terminal interconnect portion
s: Axial direction t: Circumferential direction
u: Radial direction

The invention claimed is:

1. A coil component comprising:

a primary winding that generates a magnetic field by an input current from outside; and a secondary winding through which an induced current generated by the magnetic field flows, wherein the primary winding includes a plurality of primary first turns and a plurality of primary second turns, each of the primary first turns and each of the primary second turns being ring-shaped as viewed in a first direction, the secondary winding includes a plurality of secondary first turns and a plurality of secondary second turns, each of the secondary first turns and each of the secondary second turns being ring-shaped as viewed in the first direction, the plurality of primary first turns and the plurality of secondary first turns are alternately arranged in the first direction to form a first tubular portion, the plurality of primary second turns and the plurality of secondary second turns are alternately arranged in the first direction to form a second tubular portion, the second tubular portion is located inside the first tubular portion as viewed in the first direction, and a direction in which the input current flows in each of the plurality of primary first turns and a direction in which the input current flows in each of the plurality of primary second turns are the same.

2. The coil component according to claim 1, wherein each of the plurality of primary first turns includes a primary first top-conductor portion and a primary first bottom-conductor portion spaced apart from each other in a thickness direction orthogonal to the first direction, each of the plurality of primary second turns includes a primary second top-conductor portion and a primary second bottom-conductor portion spaced apart from each other in the thickness direction, each of the plurality of secondary first turns includes a secondary first top-conductor portion and a secondary first bottom-conductor portion spaced apart from each other in the thickness direction, and each of the plurality of secondary second turns includes a secondary second top-conductor portion and a secondary second bottom-conductor portion spaced apart from each other in the thickness direction.

3. The coil component according to claim 2, wherein the primary first top-conductor portion and the secondary first top-conductor portion overlap with each other as viewed in the first direction, and the primary first bottom-conductor portion and the secondary first bottom-conductor portion overlap with each other as viewed in the first direction.

4. The coil component according to claim 3, wherein the primary second top-conductor portion and the secondary second top-conductor portion overlap with each other as viewed in the first direction, and the primary second bottom-conductor portion and the secondary second bottom-conductor portion overlap with each other as viewed in the first direction.

5. The coil component according to claim 4, wherein, in the thickness direction, a distance separating the primary second top-conductor portion and the primary second bottom-conductor portion is larger than each of a distance separating the primary first top-conductor portion and the primary second top-conductor portion and a distance separating the primary second bottom-conductor portion and the primary first bottom-conductor portion.

6. The coil component according to claim 3, wherein the primary first top-conductor portion and the secondary second top-conductor portion overlap with each other as viewed in the thickness direction, and the primary first bottom-conductor portion and the secondary second bottom-conductor portion overlap with each other as viewed in the thickness direction.

7. The coil component according to claim 6, wherein the primary second top-conductor portion and the secondary first top-conductor portion overlap with each other as viewed in the thickness direction, and the primary second bottom-conductor portion and the secondary first bottom-conductor portion overlap with each other as viewed in the thickness direction.

8. The coil component according to claim 3, wherein each of the plurality of primary first turns includes a pair of primary first connecting-conductor portions each extending from the primary first top-conductor portion in the thickness direction, one of the pair of primary first connecting-conductor portions leads to the primary first bottom-conductor portion, each of the plurality of primary second turns includes a pair of primary second connecting-conductor portions each extending from the primary second top-conductor portion in the thickness direction, and one of the pair of primary second connecting-conductor portions leads to the primary second bottom-conductor portion.

9. The coil component according to claim 8, wherein another one of the pair of primary first connecting-conductor portions leads to the primary first bottom-conductor portion of an adjacent one of the primary first turns, and another one of the pair of primary second connecting-conductor portions leads to the primary second bottom-conductor portion of an adjacent one of the primary second turns.

10. The coil component according to claim 9, wherein the primary winding further includes a primary connecting portion electrically connecting one of the plurality of primary first turns and one of the plurality of primary second turns.

11. The coil component according to claim 9, wherein each of the plurality of secondary first turns includes a pair of secondary first connecting-conductor portions each extending from the secondary first top-conductor portion in the thickness direction, one of the pair of secondary first connecting-conductor portions leads to the secondary first bottom-conductor portion, each of the plurality of secondary second turns includes a pair of secondary second connecting-conductor portions each extending from the secondary second top-conductor portion in the thickness direction, and one of the pair of secondary second connecting-conductor portions leads to the secondary second bottom-conductor portion.

12. The coil component according to claim 11, wherein another one of the pair of secondary first connecting-conductor portions leads to the secondary first bottom-conductor portion of an adjacent one of the secondary first turns, and another one of the pair of secondary second connecting-conductor portions leads to the secondary second bottom-conductor portion of an adjacent one of the secondary second turns.

13. The coil component according to claim 12, wherein the secondary winding further includes a secondary connecting portion electrically connecting one of the plurality of secondary first turns and one of the plurality of secondary second turns.

14. The coil component according to claim 2, wherein each of the first tubular portion and the second tubular portion is annular as viewed in the thickness direction, with a circumferential direction thereof corresponding to the first direction.

15. The coil component according to claim 14, wherein each of the primary first top-conductor portion, the primary first bottom-conductor portion, the secondary first top-conductor portion and the secondary first bottom-conductor portion extends from an inner circumferential edge to an outer circumferential edge of the first tubular portion, as viewed in the thickness direction.

16. The coil component according to claim 15, wherein each of the primary first top-conductor portion, the primary first bottom-conductor portion, the secondary first top-conductor portion and the secondary first bottom-conductor portion is in a form of a strip as viewed in the thickness direction.

17. The coil component according to claim 15, wherein each of the primary first top-conductor portion and the secondary first top-conductor portion is inclined in a first sense of the circumferential direction of the first tubular portion with respect to a radial direction of the first tubular portion, as viewed in the thickness direction, and each of the primary first bottom-conductor portion and the secondary first bottom-conductor portion is inclined in a second sense of the circumferential direction of the first tubular portion with respect to the radial direction of the first tubular portion, as viewed in the thickness direction.

18. The coil component according to claim 14, wherein each of the primary second top-conductor portion, the primary second bottom-conductor portion, the secondary second top-conductor portion and the secondary second bottom-conductor portion extends from an inner circumferential edge to an outer circumferential edge of the second tubular portion, as viewed in the thickness direction.

19. The coil component according to claim 18, wherein each of the primary second top-conductor portion, the primary second bottom-conductor portion, the secondary second top-conductor portion and the secondary second bottom-conductor portion is in a form of a strip as viewed in the thickness direction.

20. The coil component according to claim 18, wherein each of the primary second top-conductor portion and the secondary second top-conductor portion is inclined in a first sense of the circumferential direction of the second tubular portion with respect to a radial direction of the second tubular portion, as viewed in the thickness direction, and each of the primary second bottom-conductor portion and the secondary second bottom-conductor portion is inclined in a second sense of the circumferential direction of the second tubular portion with respect to the radial direction of the second tubular portion, as viewed in the thickness direction.

21. A coil built-in substrate incorporating the coil component according to claim 2, comprising:

a plurality of interconnect layers laminated in the thickness direction; and a plurality of insulating layers interposed between the plurality of interconnect layers in the thickness direction, wherein the coil component is constituted by wiring patterns of the plurality of interconnect layers.

22. The coil built-in substrate according to claim 21, wherein the coil component is a transformer.

* * * * *